(12) United States Patent
Sugiyama et al.

(10) Patent No.: US 6,498,962 B2
(45) Date of Patent: *Dec. 24, 2002

(54) NUMERICALLY CONTROLLED MACHINING APPARATUS FOR AUTOMATICALLY EXCHANGING TOOLS AND WORKPIECES

(75) Inventors: Kazuhisa Sugiyama, Nagoya (JP); Atsuko Tsukamoto, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/759,237

(22) Filed: Jan. 16, 2001

(65) Prior Publication Data

US 2001/0001841 A1 May 24, 2001

Related U.S. Application Data

(63) Continuation of application No. 08/159,618, filed on Dec. 1, 1993, now Pat. No. 6,314,336.

(30) Foreign Application Priority Data

Dec. 2, 1992 (JP) .............................................. 4-323169

(51) Int. Cl.[7] .......................... G05B 9/02; G05B 11/01; G06F 19/00
(52) U.S. Cl. .......................... 700/179; 700/27; 700/80; 700/81; 700/162; 700/177
(58) Field of Search .............................. 700/18, 26, 27, 700/80, 81, 162, 169, 174, 175, 177, 179, 180, 185

(56) References Cited

U.S. PATENT DOCUMENTS

| | | | | |
|---|---|---|---|---|
| 3,605,909 A | | 9/1971 | Lemelson | |
| 3,633,011 A | | 1/1972 | Bederman et al. | 364/474.17 |
| 4,314,330 A | * | 2/1982 | Slawson | 318/570 |
| 4,521,860 A | | 6/1985 | Kanematsu et al. | 364/474 |
| 4,530,046 A | | 7/1985 | Munekata et al. | 364/191 |
| 4,543,636 A | * | 9/1985 | Noda et al. | 318/569 |
| 4,571,670 A | | 2/1986 | Kishi et al. | 364/171 |
| 4,608,643 A | | 8/1986 | Breitenstein et al. | 364/474 |
| 4,631,465 A | | 12/1986 | Fukuyama et al. | 318/565 |
| 4,648,028 A | | 3/1987 | Deklotz et al. | 864/188 |

(List continued on next page.)

FOREIGN PATENT DOCUMENTS

| | | |
|---|---|---|
| DE | 1962877 | 6/1971 |
| DE | 211992 | 8/1984 |
| EP | 0106253 | 4/1984 |
| EP | 0287071 | 10/1988 |
| EP | 0364716 | 4/1990 |
| EP | 0395470 | 10/1990 |
| EP | 0479173 | 4/1992 |
| FR | 2675727 | 10/1992 |
| GB | 2147121 | 5/1985 |
| JP | 58114839 | 7/1983 |
| JP | 61111853 | 5/1986 |
| JP | 62224555 | 10/1987 |
| JP | 360924 | 3/1991 |
| JP | 470907 | 3/1992 |

*Primary Examiner*—Leo Picard
*Assistant Examiner*—Elliot Frank
(74) *Attorney, Agent, or Firm*—Sughrue Mion, PLLC

(57) ABSTRACT

A numerically controlled machining apparatus that displays data, such as a tool reduction allowance, a tool core gap amount, and a tool shape and the like for a tool. The data is displayed along with the setting condition of a tool as it is set by a tool exchanging device. The data is detected by a tool set detecting device. A tool setting condition display identifies a tool which is set in the tool exchanging device and a tool that is not set in the tool exchanging device by use of a different color.

10 Claims, 35 Drawing Sheets

U.S. PATENT DOCUMENTS

| | | | |
|---|---|---|---|
| 4,821,198 A | 4/1989 | Takeuchi et al. | 364/474.21 |
| 4,922,440 A * | 5/1990 | Kawamura et al. | 700/180 |
| 4,967,189 A * | 10/1990 | Sumita et al. | 219/69.12 |
| 5,043,644 A * | 8/1991 | Sasaki et al. | 318/568.1 |
| 5,115,400 A | 5/1992 | Watanabe et al. | 364/474.24 |
| 5,193,421 A * | 3/1993 | Meisinger | 483/1 |
| 5,249,131 A | 9/1993 | Kato | 364/478 |
| 5,257,199 A | 10/1993 | Tsujino et al. | 364/474.02 |
| 5,313,402 A | 5/1994 | Ito | 364/474.23 |
| 5,316,726 A | 5/1994 | Babson et al. | 364/188 |
| 5,327,350 A | 7/1994 | Endo | 364/474.21 |

* cited by examiner

FIG.2

120A Display for Program Using Electrode/Setting Electrode

| Electrode (T) | Reduce Allowance (R) | Shape (D) | Electrode Core Gap Amount ||||
|---|---|---|---|---|---|---|
| | | | X-Axis Direction | Y-Axis Direction | Z-Axis Direction | C-Axis Direction |
| 10 | | | 0.0000 | 0.0000 | 0.0000 | 0.0000 |
| 11 | 500 | Square | 20.0000 | 10.0000 | 30.0000 | 0.0000 |
| 12 | | | | | | |

FIG. 3

■ Inverted to Blue : Setting workpiece
▨ Inverted to Red : Lack workpiece

⟨ Using workpiece ⟩  121

|    | 0 | 1 | 2 | 3 | 4 | 5 | 6 | 7 | 8 | 9 |
|----|---|---|---|---|---|---|---|---|---|---|
| 00 |   | ■ | ▨ |   |   |   |   |   |   |   |
| 10 |   |   |   |   |   |   |   |   |   |   |
| 20 |   |   |   |   |   |   |   |   |   |   |
| 30 |   |   |   |   |   |   |   |   |   |   |
| 40 |   |   |   |   |   |   |   |   |   |   |
| 50 |   |   |   |   |   |   |   |   |   |   |
| 60 |   |   |   |   |   |   |   |   |   |   |
| 70 |   |   |   |   |   |   |   |   |   |   |
| 80 |   |   |   |   |   |   |   |   |   |   |
| 90 |   |   |   |   |   |   |   |   |   |   |

FIG. 4

122 Electrode Data Setting Display

| Electrode (T) | Reduce Allowance (R) | Shape (D) | Electrode Core Gap Amount | | | |
|---|---|---|---|---|---|---|
| | | | X-Axis Direction | Y-Axis Direction | Z-Axis Direction | C-Axis Direction |
| 10 | | | 0.0000 | 0.0000 | 0.0000 | 0.0000 |
| 11 | 500 | Square | 20.0000 | 10.0000 | 30.0000 | 0.0000 |
| 12 | | | | | | |

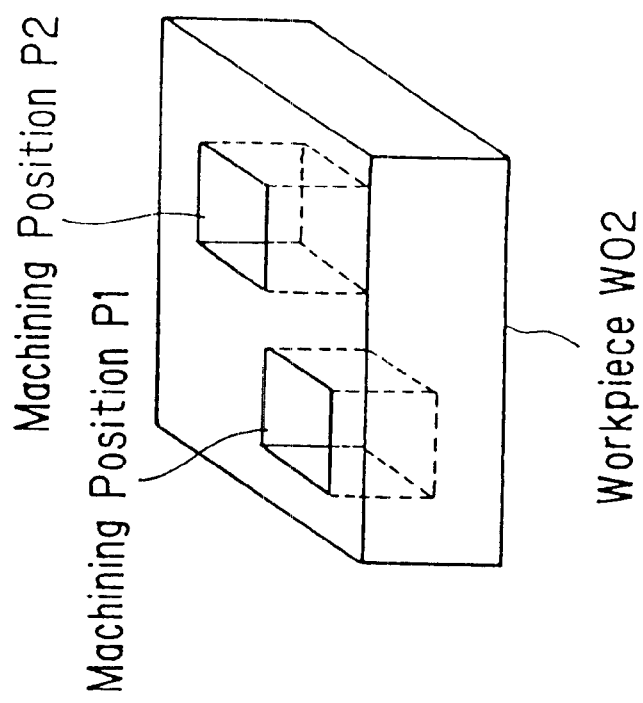
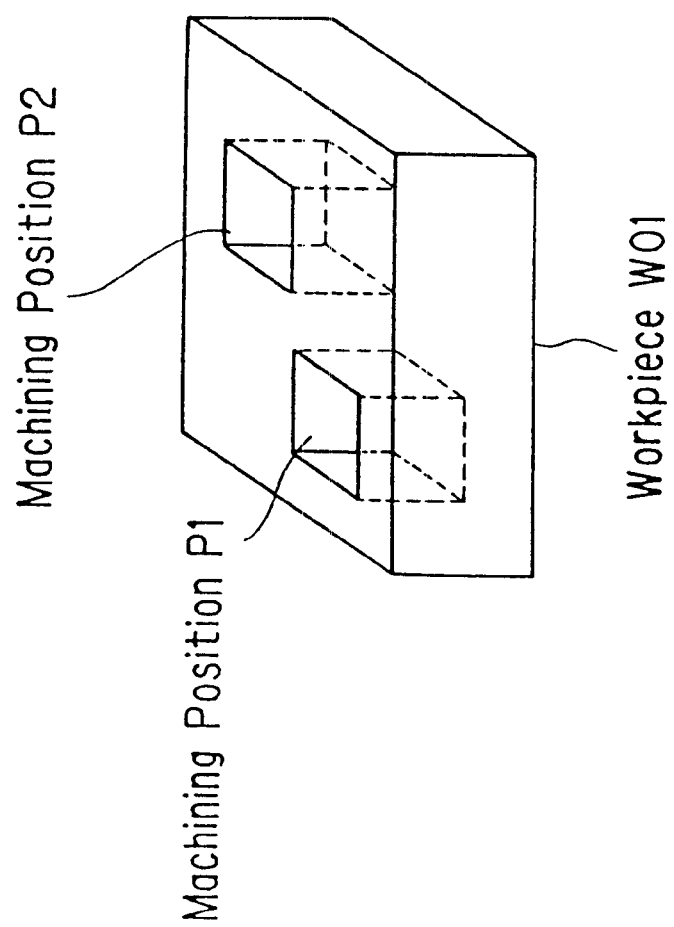
FIG. 7A
FIG. 7B

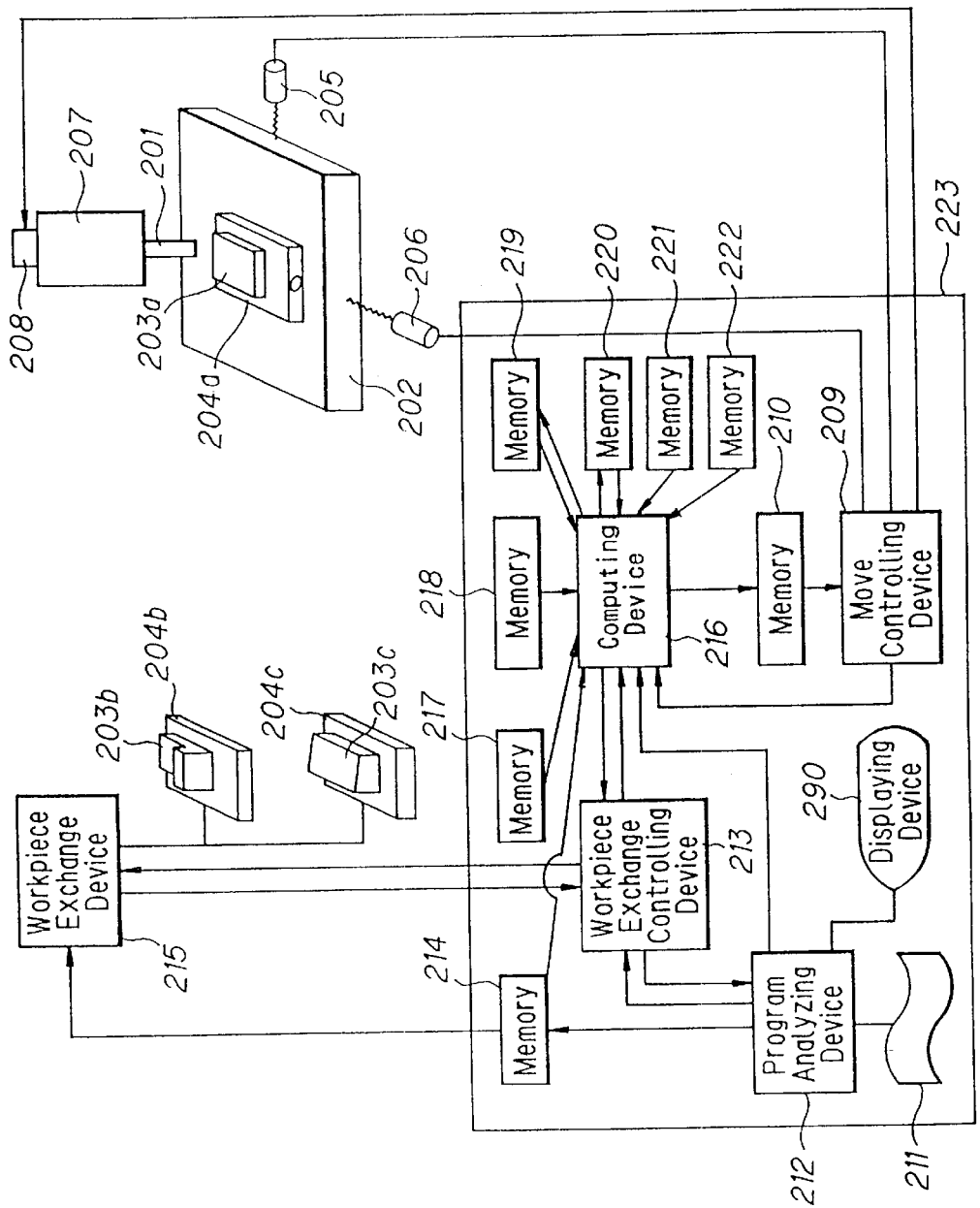

| (Number of Registered Program) | 106 Rest | 1494 |
| (Number of Memorized Letter) | 57865 Rest | 890750 |

| ⟨Program⟩ | ⟨Letter⟩⟨ST⟩ | ⟨Comment⟩ |
|---|---|---|
| 1 | 330 | SAMPLE1 |
| 311 | 278 | G31-NOR-Z-C-4 |
| 312 | 316 | G31-2-Z-C-4 |
| 321 | 463 | I:E1-Z-C-4 |
| 322 | 497 | I:E1-2-Z-C-4 |
| 341 | 387 | N1M1-Z-C-3 |
| 342 | 387 | N1M2-Z-C-3 |
| 343 | 387 | N1M3-Z-C-4 |
| 344 | 387 | N1M4-Z-C-4 |
| 400 | 137 | |
| 1212 | 8 | |
| 2002 | 901 | SF-202-0.3-2 |
| 2121 | 190 | |
| 3210 | 17 | |
| 4000 | 1124 | MASTER-P-MODEL-208 |

▲Comment
▲Eliminate ▲Replacement ▲L.NO.Modification▲
▲Comment ▲Copy ▲Arrangement
▲L ( )Comment (

| ⟨Program⟩ | ⟨Letter⟩⟨ST⟩ | ⟨Comment⟩ |
|---|---|---|
| 4020 | 1124 | MASTER-P-MODEL-202 |
| 4100 | 918 | G11-202-1.0/0.3-2 |
| 7002 | 8 | |
| 7083 | 21 | |
| 7701 | 153 | |
| 7702 | 355 | DENKYOKU-HOSEI |
| 7703 | 371 | WORK-ICHIGIME |
| 7704 | 214 | DANDORI-C HOSEI |
| 7712 | 490 | RANDAN-APC |
| 7713 | 884 | MULTI-WORK-POSI |
| 7714 | 360 | RANDAN-C |
| 7901 | 236 | G31-BARATSUKI-TEST |
| 8022 | 20 | |
| 8071 | 588 | |
| 8072 | 508 | SHU-JOKEN CALL |

Program Display

Next Display

| Program Number | L1 |
| --- | --- |
| Comment | SAMPLE1 |

| Workpiece | SKD11 Two Pieces |
| --- | --- |
| Electrode | Two Steel Electrodes (19.3mm)<br>Rough Machining : Reduce Allowance 0.35<br>Finishing Machining : Reduce Allowance 0.1 |
| Machining Depth | 20mm |
| Surface Roughness | 2μRmax |
| Wear | Low-Wear Machining |
| Dielectric Fluid Processing | No Jet Stream Machining |
| Machining | Expansion Machining |

31

FIG. 29A  FIG. 29B
PRIOR ART   PRIOR ART
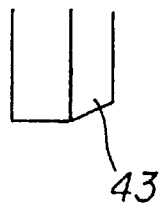
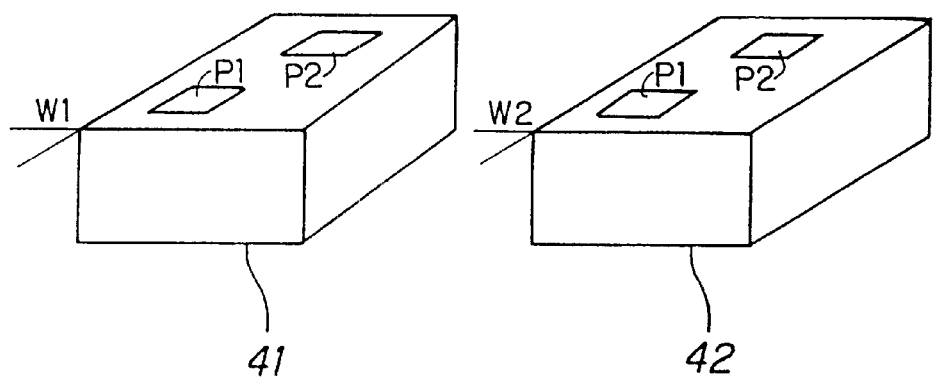

FIG. 30
PRIOR ART

SAMPLE1 — S1
```
(------ARA-KAKOU------;     — S2
T11 ;                        — S3
(--WORK1-P1------;           — S4
W1 ;                         — S5
G90 ;                        — S6
G00 P1(KAKOU-ICHI-P1;        — S7
M80 M84 ;                    — S8
G01 Z-10. ;                  — S9
M81 M85 ;                    — S10
G00 P1 M25 ;                 — S11
(--WORK1-P2------;           — S12
G00 P2(KAKOU-ICHI-P2;        — S13
M80 M84 ;                    — S14
G01 Z-10. ;                  — S15
M81 M85 ;                    — S16
G00 P2 M25 ;                 — S17
(--WORK2-P1------;           — S18
W2 ;
```

Program Compiling — 45
```
G90 ;                        — S19
G00 P1(KAKOU-ICHI-P1;        — S20
M80 M84 ;                    — S21
G01 Z-10. ;                  — S22
M81 M85 ;                    — S23
G00 P1 M25 ;                 — S24
(--WORK2-P2------;           — S25
G00 P2(KAKOU-ICHI-P2;        — S26
M80 M84 ;                    — S27
G01 Z-10. ;                  — S28
M81 M85 ;                    — S29
G00 P2 M25 ;                 — S30
(------STAGE-KAKOU------;    — S31
T12 ;                        — S32
(--WORK1-P1------;           — S33
W1 ;                         — S34
G90 ;                        — S35
G00 P1(KAKOU-ICHI-P1;        — S36
```
Next Display

FIG. 31 PRIOR ART

```
M80 M84 ;           —S37
G01 Z-10. ;         —S38
M81 M85 ;           —S39
G00 P1 M25 ;        —S40
(--WORK1-P2---;)    —S41
G00 P2(KAKOU-ICHI-P1);  —S42
M80 M84 ;           —S43
G01 Z-10. ;         —S44
M81 M85 ;           —S45
G00 P2 M25 ;        —S46
(--WORK2-P1---;)    —S47
W2 ;                —S48
G90 ;               —S49
G00 P1(KAKOU-ICHI-P1);  —S50
M80 M84 ;           —S51
G01 Z-10. ;         —S52
M81 M85 ;           —S53
G00 P1 M25 ;        —S54
```

45 — Program Compiling

```
(--WORK2-P2---;)        —S55
G00 P2(KAKOU-ICHI-P2);  —S56
M80 M84 ;               —S57
G01 Z-10. ;             —S58
M81 M85 ;               —S59
G00 P2 M25 ;            —S60
M2 ;                    —S61
%
```

NUMERICALLY CONTROLLED MACHINING APPARATUS FOR AUTOMATICALLY EXCHANGING TOOLS AND WORKPIECES

This is a Continuation of Application Ser. No. 08/159,618 filed Dec. 1, 1993, now the U.S. Pat. No. 6,314,336 the disclosure of which is incorporated herein by reference.

FIELD OF THE INVENTION

The present invention relates to a numerically controlled machining apparatus which improves arrangements for any step of a machining process and administration of machining programs, and more particularly, to a numerically controlled machining apparatus which improves arrangements for workpieces and administration of machining programs concerning an electrode and workpieces in an electric discharge machining apparatus. And the present invention also relates to a numerically controlled machining apparatus which executes position control of an electrode and a plurality of workpieces, each having respectively a different shape, in a case where machining is executed by changing the plurality of workpieces.

BACKGROUND OF THE INVENTION

FIG. 25 shows a configuration of conventional electric discharge machining apparatus, and in FIG. 25, reference numeral 1 denotes an electrode, numeral 2 denotes workpiece, numeral 3 denotes a workpiece fixing device, numeral 4 denotes a X-axis motor, numeral 5 denotes a Y-axis motor, numeral 6 denotes a cross table which moves freely to X-axis direction and Y-axis direction by the X-axis motor 4 and the Y-axis motor 5. Numeral 7 denotes an ascending/descending shaft on which the electrode 1 having a specified shape is mounted and which is moved in the direction of Z-axis by a Z-axis motor 8, numeral 9 denotes a machining power supply for execution of electric discharge machining with electric energy between the electrode 1 and the workpiece 2, numeral 10 denotes an electrode exchange device which automatically exchanges the electrode 1 with a new one.

Reference numeral 11 denotes a NC tape/floppy disk as a medium storing a program for a machining sequence, data on a electrode such as an electrode reduction allowance, an electrode core gap, an electrode shape and the like, and data concerning workpieces such as a machining position and machining depth, said data being used to decide how and what point of a workpiece to be machined are stored. Numeral 12 denotes a keyboard for compiling a program and specifying the data concerning the electrode and workpieces.

Reference numeral 14 denotes a program outside inputting means for inputting data into a program from outside which displays a mistake in a program. This applies in case where if the program with machining sequence commands stored in an NC tape/floppy disk 11 has a mistake, and transfers the program to a memory 15. It also applies in a case where there is no mistake. Numeral 16 denotes a program compiling means which checks whether an input through the keyboard 12 has a mistake or not, transfers the information entered from the keyboard 12 to the program memory 15, in case where, there is no mistake in the entered information.

Reference numeral 17 denotes an electrode data outside inputting means for entering electrode data from outside which displays a mistake in the electrode data, in case where if the electrode data such as the electrode reduction allowance, the electrode core gap amount, the electrode shape and the like stored in the NC tape/floppy disk 11 has any mistake. It transfers the electrode data to an electrode data memory 18, in case where there is no mistake. Numeral 19 denotes an electrode data compiling means which checks whether an input through the keyboard 12 has a mistake or not, transfers the information entered from the keyboard 12 to the electrode data memory 18, in case where there is no mistake in the entered information.

Reference numeral 20 denotes a workpiece data outside inputting means for entering workpiece data from outside which displays a mistake in the workpiece data, in a case where if the workpiece data such as the machining position and the machining depth and the like of the workpiece 2 stored in and inputted from the NC tape/floppy disk 11 has any mistake, and transfers the workpiece data to an workpiece data memory 21, in case where, there is no mistake. Numeral 22 denotes a workpiece data compiling means which checks whether an input from the keyboard 12 has a mistake or not, and transfers the information entered from the keyboard 12 to the workpiece data memory 21, in case where there is no mistake in the entered information.

Reference numeral 23 denotes an operation command analyzing means which executes an analysis of command data issued from the program memory 15, the electrode data memory 18, and the workpiece data memory 21 according to the machining program. Numeral 24 denotes an axis move control means which outputs data concerning the shaft generated by the operation command analyzing means 23 to each of the X-axis motor 4, Y-axis motor 5 and Z-axis motor 8 and drives the XY cross table 6 and the ascending/descending shaft 7. Numeral 25 denotes an electrode exchange device controlling means which transfers an electrode exchange command analyzed by the operation command analyzing means 23 to the electrode exchange device 10.

Reference numeral 26 denotes a program start key which gives an instruction for start of a program to the operation command analyzing means 23, numeral 27 denotes a NC control apparatus including the program outside inputting means 14, the program memory 15, the program compiling means 16, the electrode data outside inputting means 17, the electrode data memory 18, the electrode data compiling means 19, the workpiece data outside inputting means 20, the workpiece data memory 21, the workpiece data compiling means 22, the operation command analyzing means 23, the axis move control means 24, and the electrode exchange device controlling means 25.

FIG. 26, FIG. 27 and FIG. 28 relate to an embodiment for the administration of a conventional machining program. Reference numeral 11 denotes the NC tape/floppy disk as a medium for storing a machining program, numeral 27 denotes the NC control apparatus, numeral 31 denotes a program manual in which machining contents of the machining program such as a number of workpieces, a number of electrodes and the like are written on paper, and numeral 32 denotes a program memory list displayed on a CRT of the NC control apparatus 27 and showing contents of the program memory 15. As above, in conventional electric discharge machining apparatus, a program is memorized in a floppy disk and the like as a medium for data entry, and all contents of the program is administered according to the program manual 31 in which all administrative instructions are written on a paper.

FIGS. 29A and 29B, FIG. 30 and FIG. 31 show a case of conventional machining where two workpieces each having two holes are machined with two electrodes. Reference numeral 41 denotes a workpiece W1, numeral 42 denotes a workpiece W2, numeral 43 denotes a rough electrode T11, numeral 44 denotes a finish electrode T12, P1 and P2 denote machining position s respectively. Reference numeral 45 denotes an embodiment of a machining program on the CRT display.

Next, the machining program 45 will be described referring to FIG. 30 and FIG. 31. Steps S1 to S30 show a rough machining step by the rough machining electrode T11 (43).

Step S2 shows to exchange an electrode to the rough electrode T11 (43). Step S3 indicates that the workpiece 41 set according to the workpiece coordinates WI is machined at the machining position P1 in Step S3 to Step S10. Step S4 indicates that a workpiece is set according to the workpiece coordinates W1. Step S5 indicates that the subsequent commands for movement are issued with absolute values. Step S6 indicates movement to the machining position P1. A dielectric and a machining are set to ON in step S7. Step S8 indicates machining by 10 mm in the direction of Z-axis. After the machining, the dielectric and the machining are set to OFF in step S9. The electrode T11 (43) returns to a machining start position when contact is ignored in step S10.

Step S11 indicates that the workpiece 41 set according to the workpiece coordinates W1 is machined at the machining position P2 in steps S11 to S16. Step S12 indicates that the electrode moves to the machining position P2. A dielectric and a machining are set to ON in step S13. The workpiece is machined by 10 mm in the direction of Z-axis in step S14. After the machining in step S15, the dielectric and the machining are set to OFF. The electrode returns to a machining start position when contact is ignored in step S16.

Step S17 indicates that the workpiece 42 set according to the workpiece coordinates W2 is machined at the machining position P1 in steps S17 to S25. Step S18 indicates that the workpiece is set according to the workpiece coordinates W2(42). Step S19 indicates that the subsequent movement command is executed with absolute values. Step S20 indicates movement of the electrode to the machining position P1. A dielectric and a machining are set to ON in step S21. Machining is executed by 10 mm in the direction of Z-axis in step S22. The dielectric and the machining are set to OFF in step S23. The electrode returns to a machining start position when contact is ignored in step S24.

Step S25 indicates that workpiece 42 is machined at the machining position P2 in steps S25 to step S30. Step S26 indicates movement of the electrode to the machining position P2. A dielectric and a machining are set to ON in step S27. Machining is executed by 10 mm in the direction of Z-axis in step S28. After the machining in step S29, the dielectric and the machining are set to OFF. The electrode returns to the machining start position in step S30 when contact is ignored.

Step S31 indicates that machining for finishing is executed by the finish electrode T12 (44) in steps S31 to S60. Step S32 indicates exchange of the finish electrode T12 (44) with a new one.

Step S33 indicates that the workpiece 41 set according to the workpiece coordinates W1 is machined at the machining position P1 in steps S33 to S40. Step S34 indicates that a workpiece is set according to the workpiece coordinates W1. Step S35 indicates that the subsequent movement command is executed with absolute values. Step S36 indicates movement of the electrode to the machining point P1. A dielectric and machining are set on to ON in step S37. Machining is executed by 10mm in the direction of Z-axis in step S38. After the machining in step S39, the dielectric and the machining are set to OFF in step S39. The electrode Tll (43) returns to the machining start position when contact is ignored in step S40.

Step S41 indicates that the workpiece 41 set according to the workpiece coordinates W1 is machined at the machining position P2 in steps S41 to S46. Step S42 indicates movement of the electrode to the machining position P2. A dielectric and a machining are set to ON in step S43. Machining is executed by 10mm in the direction of Z-axis in step S44. After the machining in step S45, the dielectric and the machining are set to OFF. The electrode returns to the machining start position when contact is ignored in step S46.

Step S47 indicates that the workpiece 42 set according to the workpiece coordinates W2 is machined in steps S47 to S54. Step S48 indicates that the workpiece 42 is set according to the workpiece coordinates W2. Step S49 indicates that the subsequent movement command is executed with absolute values. Step S50 indicates movement of the electrode to the machining position P1. A dielectric and a machining are set to ON in step S51. Machining is executed by 10mm in the direction of Z-axis in step S52. The dielectric and the machining are set to OFF in step S53. The electrode returns to the machining start position when contact is ignored in step S54.

Step S55 indicates that the workpiece 42 set according to the workpiece coordinates W2 is machined at the machining position P2 in steps S55 to S60. Step S56 indicates movement of the electrode to the machining position P2. A dielectric and a machining are set to ON in step S57. Machining is executed by 10 mm in the direction of Z-axis in step S58. After the machining in step S59, the dielectric and the machining are set to OFF. The electrode returns to the machining start position when contact is ignored in step S60. Step S61 indicates the end of execution of the program.

Next, another conventional electric discharge machining apparatus will be described. FIG. 32 is a block diagram showing the configuration of conventional discharge machining apparatus. Referring to FIG. 32, reference numeral 201 denotes an electrode, numeral 202 denotes a table, numeral 203a denotes a workpiece having a workpiece number 11, numeral 203b denotes a workpiece having a workpiece number 12. Numeral 203c denotes a workpiece having a workpiece number 13, numeral 204a denotes a workpiece fixing device for fixing the workpiece 203a on the table 202, numeral 204b denotes a workpiece fixing device for fixing the workpiece 203b on the table, numeral 204c , denotes a workpiece fixing device for fixing the workpiece 203c on the table, numeral 205, 206 denote a motor for moving the table 202 in the X, Y directions, numeral 207 denotes a spindle with the electrode 201 mounted thereon, numeral 208 denotes a motor for moving the spindle 207.

Reference numeral 209 denotes a move controlling device for controlling movement of the motor 205, the motor 206 and the motor 208, numeral 210 denotes a memory outputting coordinates for machining, numeral 211 denotes a NC program including a workpiece exchange command, numeral 212 denotes a program analyzing device for analyzing the NC program 211, numeral 213 denotes a workpiece exchange controlling device for controlling exchange of a workpiece, numeral 214 denotes a memory storing a number of workpiece to be newly set.

Reference numeral 215 denotes a workpiece exchange device for executing the workpiece (workpiece 203a, workpiece 203b or workpiece 203c) fixed on the table 202 at a position for exchanging with the workpiece fixing device (workpiece fixing device 204a, workpiece fixing device 204b or workpiece fixing device 204c), and for carrying in the workpiece (workpiece 203a, workpiece 203b or workpiece 203c) with the workpiece fixing device (workpiece fixing device 204a, workpiece fixing device 204b or workpiece fixing device 204c) to the table 202, and for fixing on the table 202.

Reference numeral 216 denotes a computing device for computing coordinates for machining, numeral 217 denotes a memory for storing coordinates of the electrode 201 on a coordinate system in which a reference point of the workpiece fixing device 204 is an origin thereof, numeral 218 denotes a memory for storing coordinates for machining, an origin of which is a reference point of the workpiece fixing device 204, numeral 220 denotes a memory for storing data in the memory 217, when an exchange of workpiece starts, numeral 221 denotes a memory for storing coordinates for machining, when a workpiece is exchanged, and numeral 223 denotes an NC control device.

FIGS. 33A and 33B are views showing a position control for the electrode 201 and the table 202 in the computing device 216. G1 denotes a machining origin specific to the machining apparatus, G2 denotes a reference point on each of the workpiece fixing devices 204a, 204b, (g1, g2, g3) denotes coordinate values of G2 in the coordinate system in which the machining origin G1 is an origin thereof, workpiece off set in the coordinate system (hereinafter referred to as "G2 coordinate system") in which the reference point G2 is an origin, (x, y, z) denotes a coordinates of the electrode 201 in the G2 coordinate system, (X, Y, Z) denotes coordinate values of the electrode 201 in the coordinates for machining. Accordingly, an expression 1 is formed between the above values.

$$(X, Y, Z) = (x, y, z) + (g1, g2, g3) \quad \text{(EXPRESSION 1)}$$

Next, operation will be described. The program analyzing device 212 starts to analyze the NC program 211 upon instruction to the program by an operator. The program analyzing device 212 reads out a workpiece exchange command from the NC program 211, issues the workpiece exchange command to the workpiece exchange controlling device 213, and stores the exchanged workpiece number in the workpiece exchange command in the memory 214. The workpiece exchange controlling device 213 outputs a workpiece exchange position movement command to the computing device 216. The computing device 216 stores coordinates in the memory 217 to the memory 220, and outputs a workpiece exchange position which is previously set in the memory 221 to the memory 210.

The move controlling device 209 outputs a movement command to the motor 205, the motor 206 and the motor 208 so that the table 202 and the spindle 207 are moved to the coordinates stored in the memory 210. The move controlling device 209 outputs an arrival signal to the computing device 216 when the table 202 and the spindle 207 arrives to the positions each specified by coordinates values stored in the memory 210. The computing device 216 outputs an exchange position arrival signal to the workpiece exchange controlling device 213 upon input of the arrival signal. The workpiece exchange controlling device 213 outputs a workpiece exchange start command to the workpiece exchange device 215 upon input of the exchange position arrival signal.

The workpiece exchange device 215 executes the workpiece 203a on the table 202 with the workpiece fixing device 204a upon input of the workpiece exchanging execute command. Then the workpiece exchange device 215 fixes the workpiece 203b having an exchanged workpiece number stored in the memory 214 with the workpiece fixing device 204b on the table by the workpiece exchange device 215. Thereafter, the workpiece exchange device 215 outputs a workpiece exchange end signal to the workpiece exchange controlling device 213, and the workpiece exchange controlling device 213 outputs a return command to the computing device 216. The computing device 216 memorizes coordinate values stored in the memory 220 to the memory 217, and figures out the sum of data stored in the memory 217 and the memory 218, proving the sum as output to the memory 210.

The move controlling device 209 outputs a movement command to the motor 205, the motor 206 and the motor 208 so that the table 202 and the spindle 207 are moved to positions each specified by coordinate values stored in the memory 210. The move controlling device 209 outputs an arrival signal to the computing device 216 upon arrival of the table 202 and the spindle 207 arrives to the positions each specified by the coordinate values stored in the memory 210. The computing device 216 outputs a return end signal to the workpiece exchange controlling device 213 upon input of the arrival signal. The workpiece exchange controlling device 213 outputs a workpiece exchange end signal to the program analyzing device 212 upon input of the return end signal.

In addition to the above, reference technical literatures relating to the present invention include Japanese Patent Laid-Open publication No. 70907/1992 disclosing "An arrangements data processing apparatus for a numerically controlled machining apparatus", Japanese Patent Laid-Open Publication No. 60924/1991 disclosing "A method of preventing an electrode from being mounted incorrectly, incorrect attachment of an electrode guide,Japanese Patent Laid-Open Publication No. 224555/1987 disclosing "A numerically controlled machining apparatus", and Japanese Patent Laid-Open Publication disclosing No. 111853/1986 disclosing "An electric discharge machining apparatus."

In the conventional electric discharge machining apparatus as described above, there are problems as follows. An operator must confirm contents of the program manual printed on paper for selecting an electrode and a workpiece according to a machining program, or must analyze a machining program, in case where the program manual is not near at hand, and as a result it is difficult to administer a program.

Also when setting electrode data, or workpiece data required for executing the program, an operator must check the program manual, or must analyze the machining program. As a result, an additional time is required for the operations, which lowers the workpiece efficiency.

Also sometimes the program may be executed even if an electrode and a workpiece as well as data concerning the electrode and the workpiece required for execution of the program have not been specified, and it is feared that, as a result, operation of the apparatus may go down during operation thereof in automatic mode at night, or under similar conditions.

After a workpiece is exchanged by the workpiece exchange device, the position of workpiece fixing device is determined at the same position before exchanging to an electrode. Accordingly in a case where, even through a workpiece has a same shape, a position of a workpiece on the workpiece fixing device is different, relative position of the workpiece to the electrode is different compared with the position before exchanging. Then, in order to machine a workpiece at the same position before exchanging, the position of the electrode must be determined by manual operation, or an exclusive NC program must be used. Accordingly, it takes time, and labor. And, in case where the workpiece exchanged is larger than the previous one, it is feared that the electrode interferes with the workpiece or the electrode and the workpiece may be damaged, which prevents automatization of machining including an exchanging process of workpieces and makes the operational efficiency lower.

SUMMARY OF THE INVENTION

It is therefore an object of the present invention to provide a numerically controlled machining apparatus that makes it possible for an operator to more easily administer a program by showing an electrode and workpiece according to the machining program. The invention also makes easier the confirming of set items for electrode data and workpiece data by showing the items to be set for the electrode data as well as for the workpiece data. The invention can prevent a start of program execution by generating an alarm even if an operator tries to start execution of the program when such data as an electrode, electrode data, workpiece and workpiece data have not been set. Thus feature is to prevent system down even during operation at night and ensure high workpiece efficiency as well as high productivity of a machine.

It is another object of the present invention to provide a numerically controlled machining apparatus which can machine automatically to a desired position by position-controlling, referring to a position and a height of the workpiece on a workpiece fixing device, and to a machining position in a case where a workpiece is exchanged in a machining to workpiece which a position and a height on the workpiece fixing device are different each other.

The numerically controlled machining apparatus according to the invention displays the setting condition of a tool as set at a tool exchanging means, which detected by a tool set detecting means.

Further, the numerically controlled machining apparatus according to the invention displays data such as a tool reduction allowance, a tool core gap amount, and a tool shape and the like of a tool, which is set by displaying the setting condition of a tool as set at the tool exchanging means, which is detected by the tool set detecting means.

Furthermore, the numerically controlled machining apparatus according to the invention displays a tool setting condition by indicating a tool which is set in the tool exchanging means and a tool that not set in the tool exchanging means with a different color, respectively.

Furthermore, the numerically controlled machining apparatus according to the present invention displays a setting state of a tool set in the tool, exchanging means and detected by the tool detecting means as well as various data concerning a tool including parameters for the tool, executes input and/or change of tool data including parameters for the tool, and edits the input tool data.

Further, the numerically controlled machining apparatus according to the invention displays setting conditions of a workpiece set in the workpiece fixing means and detected by a workpiece set detecting means.

Furthermore, the numerically controlled machining apparatus according to the present invention displays a setting state of a workpiece set in the workpiece fixing means and detected by the workpiece set detecting means, and workpiece data such as a machining position and a machining depth.

Furthermore, the numerically controlled machining apparatus according to the invention displays a workpiece setting condition by indicating a tool which is set in the workpiece fixing means and a tool that not set in the workpiece fixing means with a different color, respectively.

Furthermore, the numerically controlled machining apparatus according to the present invention displays a setting state of a workpiece that has been set in the workpiece fixing means and has been detected by the workpiece set detecting means, executes input and or change of workpiece data such as a machining position or a machining depth, and also edits the workpiece data supplied as input thereto.

Moreover, the numerically controlled machining apparatus according to the invention stops a program, displays the necessary tool for continuation of the execution of the program, and issues an instruction for setting the tool, when it is detected by the tool set detecting means that a necessary tool has not been set in the tool exchanging means.

Further, the numerically controlled machining apparatus according to the invention stops a program, displays a necessary workpiece for continuation of the execution of the program, and issues an instruction for setting the tool, when it is detected by a workpiece set detecting means that the necessary workpiece has not been set in the workpiece fixing means.

Further the numerically controlled machining apparatus according to the invention stops a program, displays necessary tool data for continuation of execution of the program, and issues an instruction for setting the tool data, when it is detected by a tool set detecting means that the necessary tool has not been set in the tool exchanging means.

Furthermore, the numerically controlled machining apparatus according to the invention stops a program, displays the necessary workpiece data for continuation of an execution of the program, and issues an instruction for setting the workpiece data, when it is detected by the workpiece set detecting means that the necessary workpiece has not been set in the workpiece fixing means.

Further, in the numerically controlled machining apparatus according to the invention, the tool set condition displaying means simultaneously displays a setting condition of a workpiece.

Furthermore, in the numerically controlled machining apparatus according to the invention, the workpiece set condition displaying means simultaneously displays a setting condition of a tool.

Further, in the numerically controlled machining apparatus according to the invention, the tool data displaying means simultaneously displays workpiece data.

Moreover, in a numerically controlled machining apparatus according to the invention, the workpiece data displaying means simultaneously displays tool data.

Furthermore, in a numerically controlled machining apparatus according to the present invention, workpiece data such as a position and a height of a workpiece on the workpiece fixing device is stored previously and a relative position between the spindle with an electrode mounted thereon and the table with a workpiece fixed thereon is controlled according to the workpiece data.

Furthermore, a numerically controlled machining apparatus according to the present invention stops execution of a program upon input of a workpiece exchange command if there is no workpiece data for the workpiece, and restarts execution of the program after the required workpiece data has been entered.

Furthermore, the numerically controlled machining apparatus according to the invention does not execute a program command until a next workpiece exchange command is inputted, in a case involving workpiece data of the workpiece which receives a workpiece exchanging command in analyzing the NC program, and executes the program after skipping the program until next workpiece exchanging command.

Moreover, the numerically controlled machining apparatus according to the invention can store workpiece data of a workpiece in each workpiece or workpiece fixing device, and can control a relative position relating to a spindle setting an electrode, and a table fixing a workpiece in accordance with the workpiece data.

Other objects and features of this invention will become understood from the following description with reference to the accompanying drawings.

BRIEF DESCRIPTION OF THE DRAWINGS

FIG. 2 is a view showing an example of program administration according to the present invention;

FIG. 3 is a view showing an example of program administration according to the present invention;

FIG. 4 is a view showing an embodiment of a method of setting necessary electrode data according to the present invention;

FIGS. 7A and 7B show an example of the workpiece W01 and W02;

FIG. 17 is a block diagram showing a general configuration of the electric discharge machining apparatus according to the present invention;

FIG. 19A is a view showing the contents of the NC program according to the present invention;

FIG. 19B is a view showing the contents of the NC program according to the present invention;

FIG. 27 is a view showing embodiment of an administration of a conventional machining program;

FIG. 28 is a view showing embodiment of an administration of a conventional machining program;

FIGS. 29A and 29B show the case of conventional machining where two workpieces each having two holes are machined with two electrodes;

FIG. 30 is a view showing case of conventional machining where two workpieces each having two holes are machined with two electrodes;

FIG. 31 is a view showing case of conventional machining where two workpieces each having two holes are machined with two electrodes;

DESCRIPTION OF THE EMBODIMENT

Figure 1A:
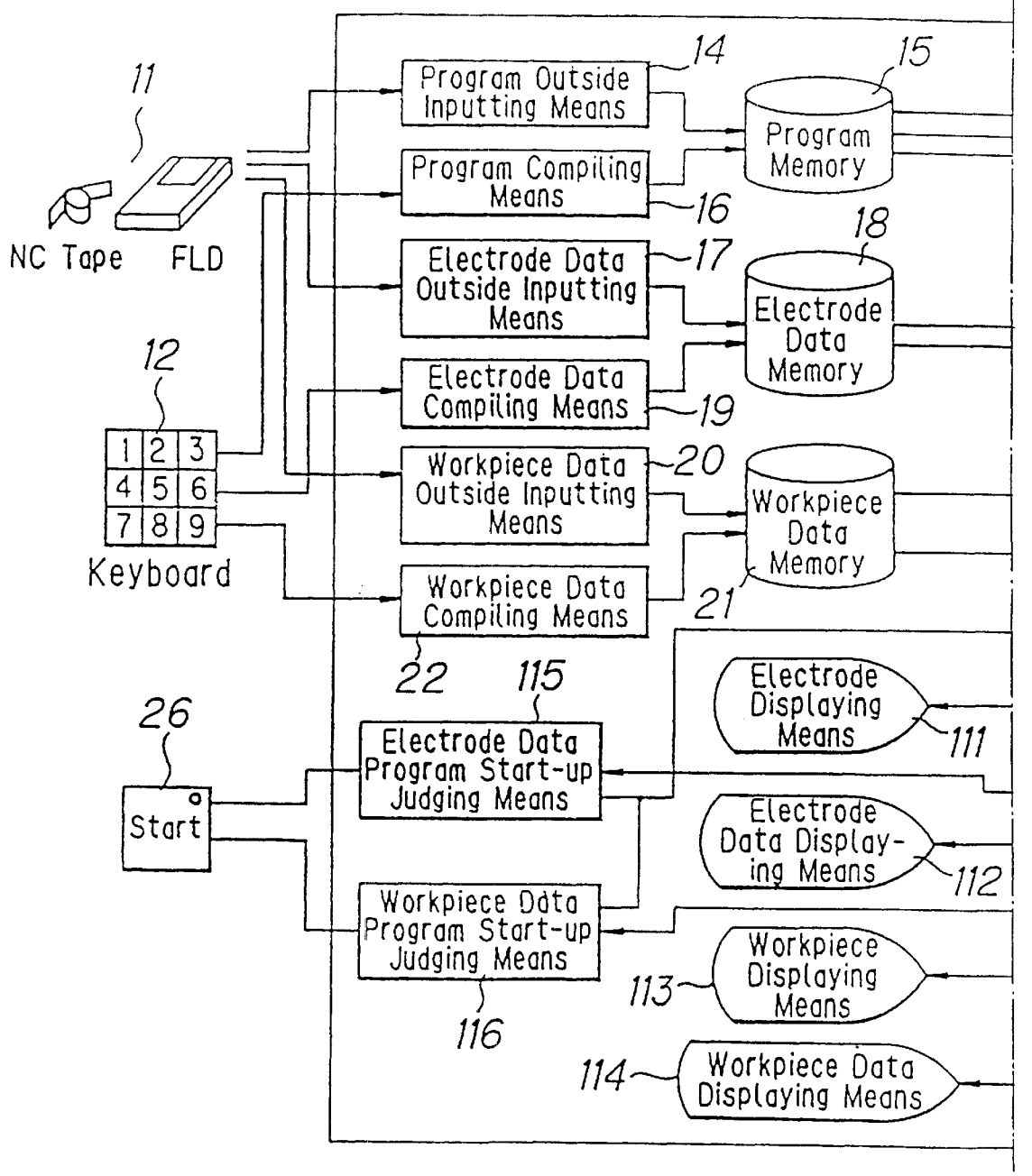
FIGS. 1A through 1C show configuration of an electric discharge machining apparatus according to the present invention.
Figure 1B:
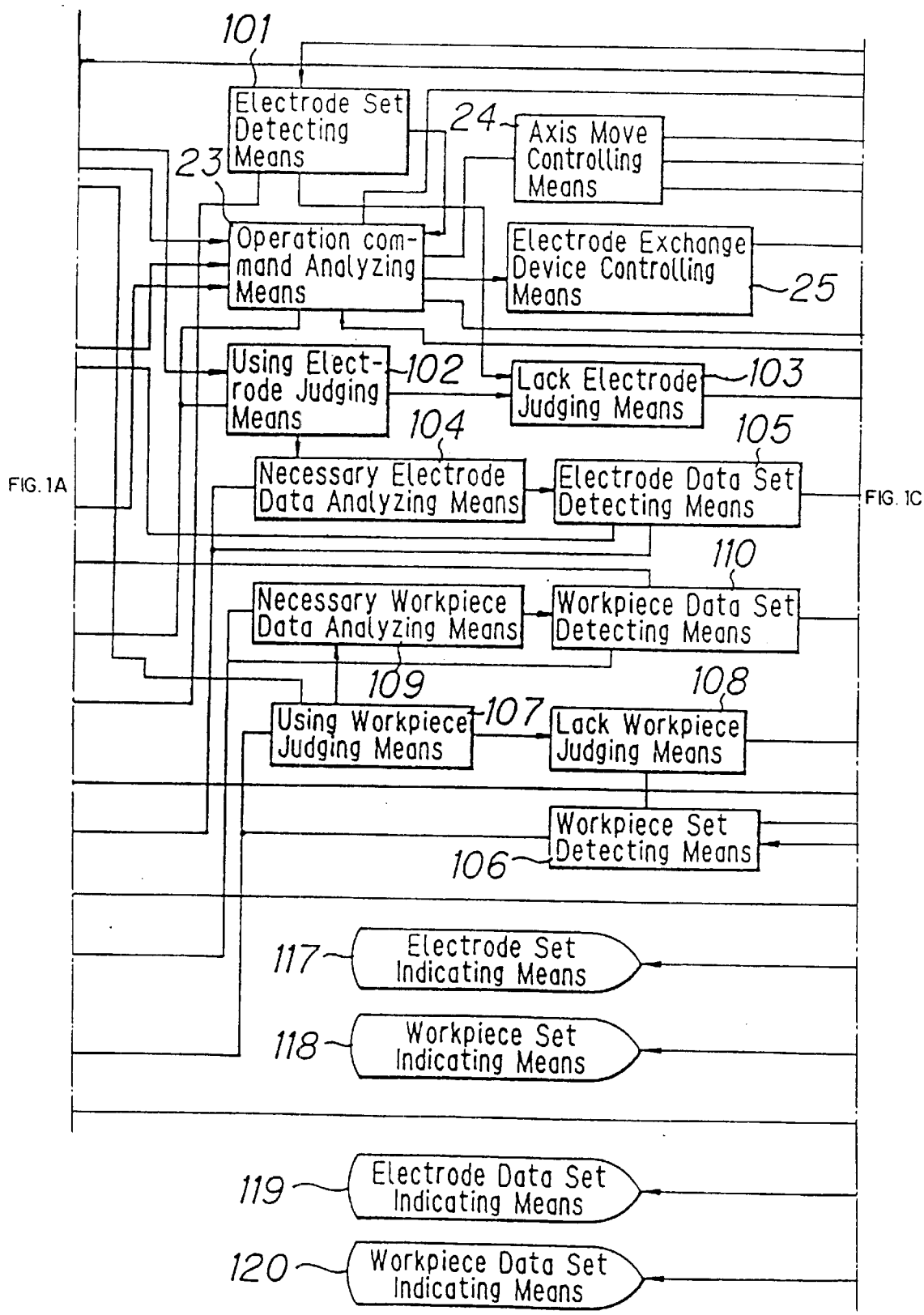
Figure 1C:
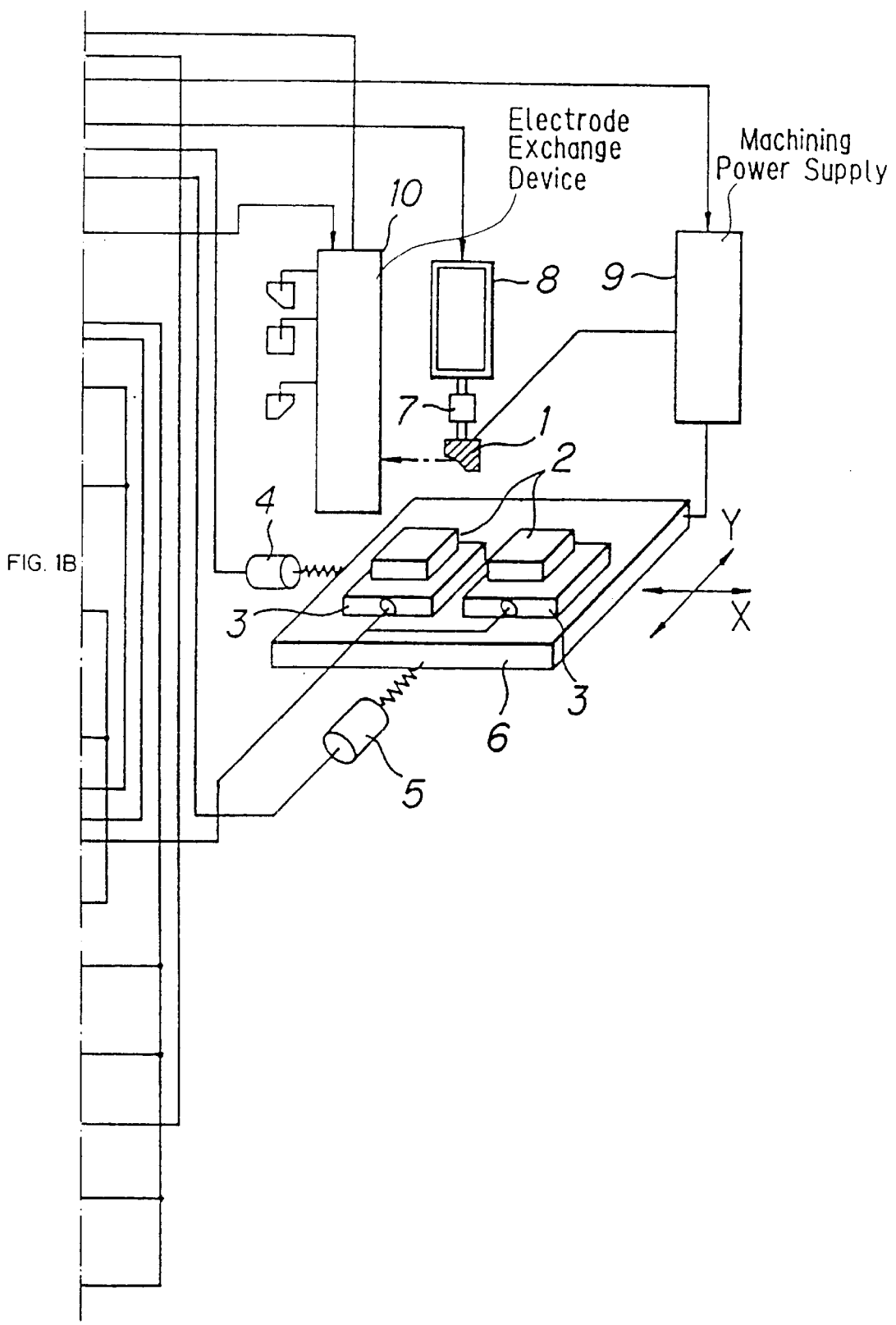
Figure 25:
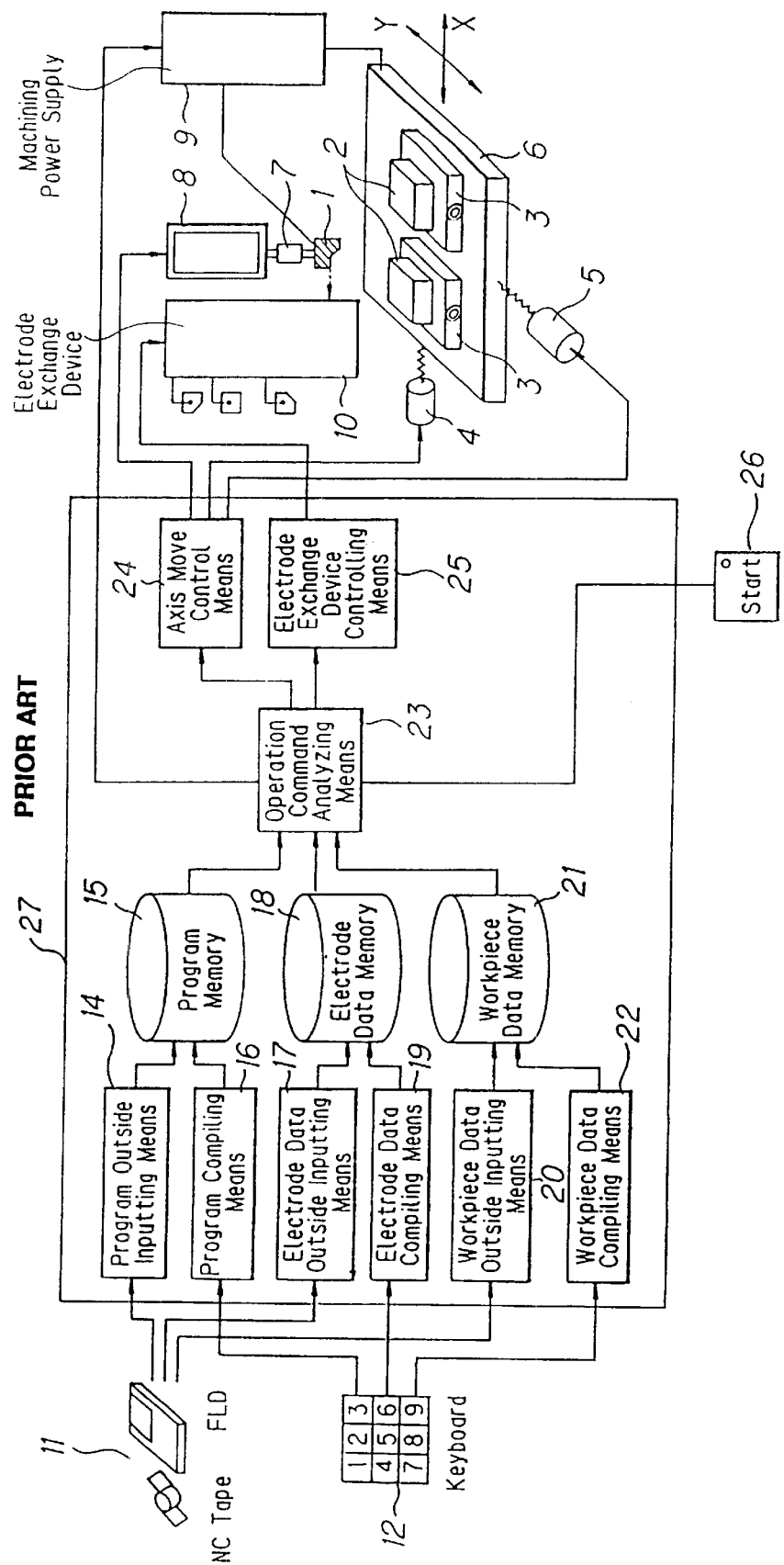
FIG. 25 is a view showing configuration of conventional electric discharge machining apparatus.
Figure 26:
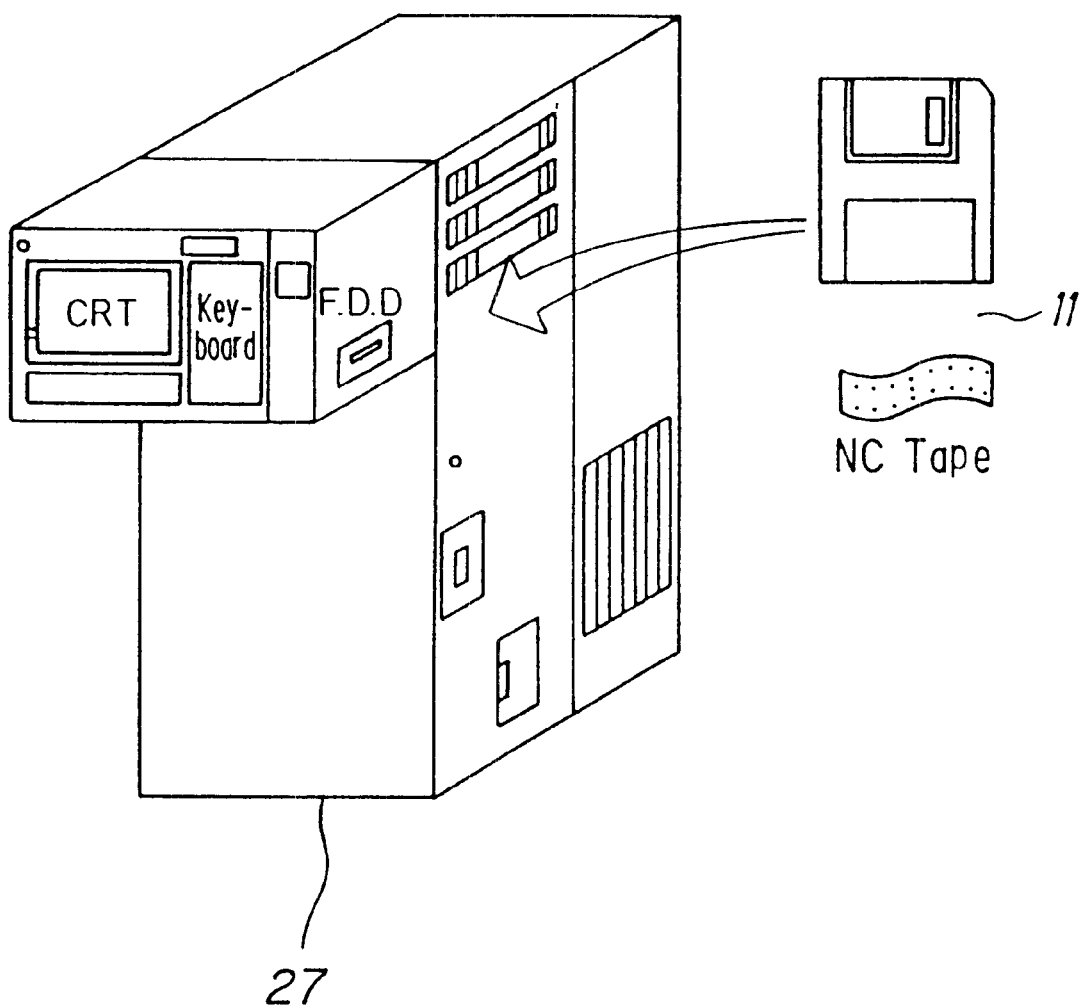
FIG. 26 is a view showing embodiment of an administration of a conventional machining program.
Figure 32:
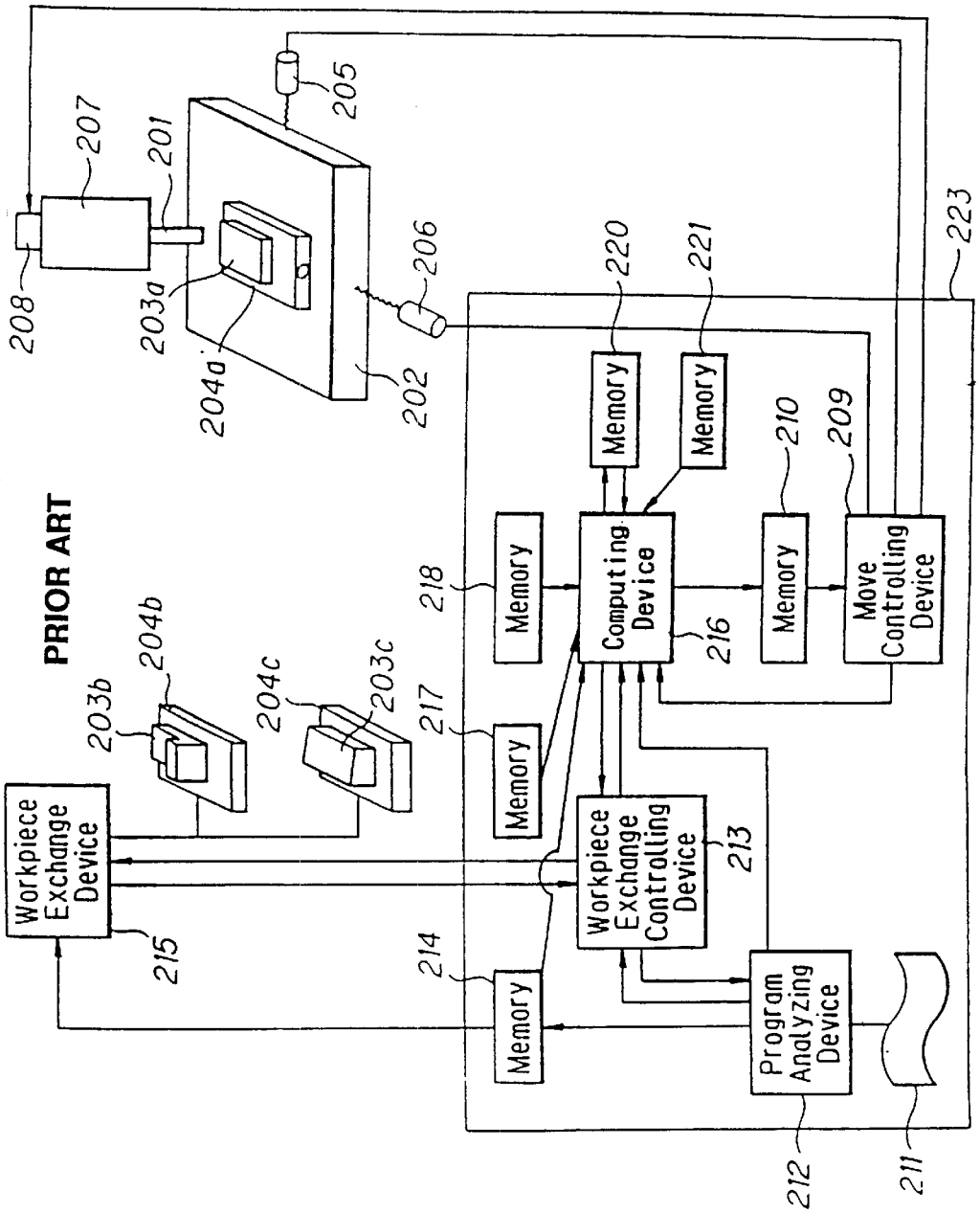
FIG. 32 is a block diagram showing configuration of conventional discharge machining apparatus.
Figure 33A:
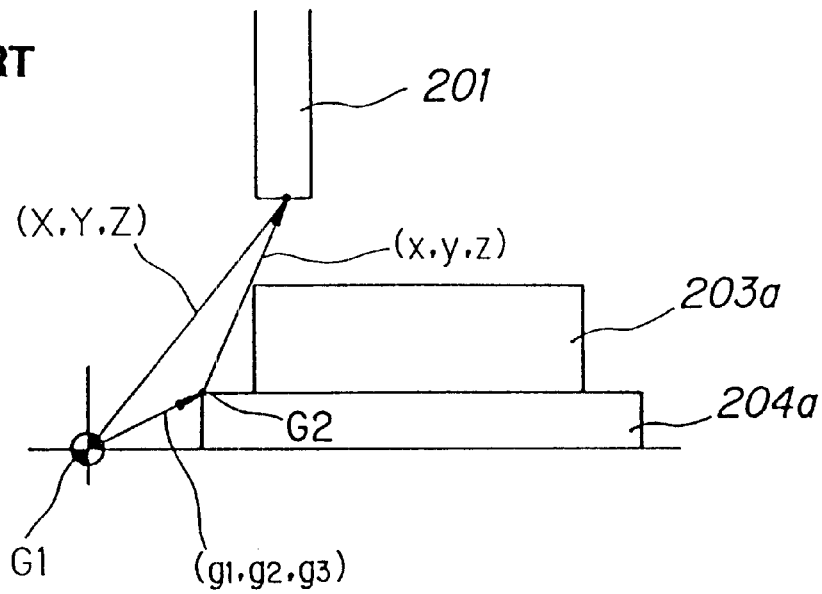
FIG. 33A is a view showing a position control for the electrode and the table in the computing device.
Figure 33B:
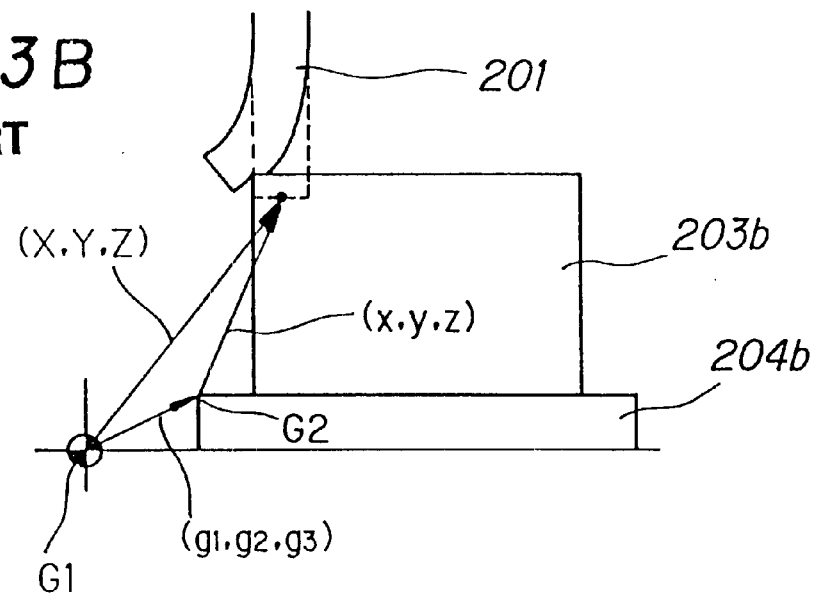
FIG. 33B is a view showing a position control for the electrode and the table in the computing device.

FIGS. 1A through 1C show the configuration of an electric discharge machining apparatus according to the present invention. Reference numerals 1–27 refer to the same structure used in the conventional apparatus shown in FIG. 25. In FIGS. 1A through 1C, reference numeral 101 denotes an electrode set detecting means for detecting a holder with an electrode set therein in the electrode exchange device 10. Numeral 102 denotes a using electrode judging means for analyzing a machine program stored in the program memory and judging using electrode before start of execution of a machining program. Numeral 103 denotes a lack electrode judging means for judging an electrode which is not set with the electrode set detecting means 101 and the using electrode judging means 102. Numeral 104 denotes a necessary electrode data analyzing means for analyzing electrode data to be set, such as an electrode reduce allowance, an electrode core gap amount, an electrode shape, said data being used for decisions by the using electrode judging means 102. Numeral 105 denotes an electrode data set detecting means for detecting electrode data which is set by a housekeeping operation of the electrode in the necessary electrode data.

Reference numeral 106 denotes a workpiece set detecting means for detecting a fixing device with a workpiece fixed therein in the workpiece fixing device 3. Numeral 107 denotes a using workpiece judging means for analyzing the machining program in the program memory 15 and judging a workpiece to be used before the start of execution of a machining program. Numeral 108 denotes a lack workpiece judging means for judging a workpiece which is not set with the workpiece set detecting means 106 and the using workpiece judging means 107. Numeral 109 denotes a necessary workpiece data analyzing means for analyzing a workpiece data which should be set, such as a machining position and a machining depth for the workpiece to be used as decided by the using workpiece judging means 107. Numeral 110 denotes a workpiece data set detecting means for detecting workpiece data which is set by a housekeeping operation for the workpiece in the necessary workpiece data.

Reference numeral 111 denotes an electrode displaying means for displaying an electrode to be used and an electrode for execution of the program by the using electrode judging means 102 and the electrode set detecting means 101 on the CRT display. Numeral 112 denotes an electrode data displaying means for displaying data for the electrode to be used as well as the set electrode data determined by the necessary electrode data analyzing means 104 and the electrode data set detecting means 105 on the CRT display. Numeral 113 denotes a workpiece displaying means for displaying a workpiece to be used as well as a set workpiece for execution of the program by the using workpiece judging means 107 and the workpiece set detecting means 106. Numeral 114 denotes a workpiece data displaying means for displaying data for a workpiece to be used as well as for a set workpiece data determined by the necessary workpiece data analyzing means 109 and the workpiece data set detecting means 110.

Reference numeral 115 denotes an electrode data program start-up judging means for ignoring an instruction for the start of program execution entered from the start key 26 and generating an alarm, in case where any lack electrode or lack electrode data is detected by the lack electrode judging means 103 and the electrode data set detecting means 105. Numeral 116 denotes a workpiece data program start-up judging means for ignoring an instruction for start of program execution entered from the start key 26 and generating an alarm, in case where any lack workpiece or lack workpiece data is detected by the lack workpiece judging means 108 and the workpiece data set detecting means 110.

Reference numeral 117 denotes an electrode set indicating means for indicating the stopping of execution of a program with the operation command analyzing means 23 when there is an attempt to execute an electrode exchange command in a program stored in the program memory 15, yet it is found by the electrode set detecting means 101 that the electrode 1 has not been set; the electrode set indicating means displays the electrode 1 which has not been set yet on the CRT unit. Numeral 118 denotes a workpiece set indicating means for indicating the stopping of execution of a program with the operation command analyzing means 23 when there is an attempt to execute a workpiece coordinates specification command in a program stored in the program memory 15, yet it is found by the workpiece set detecting means 106 that the workpiece 2 has not been set; the workpiece set indicating means displays the workpiece 2 on the CRT unit. Numeral 119 denotes an electrode data set indicating means for indicating the stopping of execution of a program with the operation command analyzing means 23 when there is an attempt to execute an electrode exchange command in the program stored in the program memory 15, yet it is found that the electrode data is not in the electrode data memory 18; the electrode set indicating means displays the data for the electrode not set on the CRT unit. Numeral 120 denotes a workpiece data set indicating means for indicating the stopping of execution of a program with the operation command analyzing means 23 when there is an attempt to execute a workpiece coordinates specification command in the program stored in the program memory 15, yet it is found that the workpiece data is not in the workpiece data memory 21; the workpiece data set indicating means displays data for the workpiece not set on the CRT display.

FIG. 2 and FIG. 3 show an example of program administration according to the present invention, and in FIG. 2, reference numeral 120A denotes a display provided by the electrode displaying means 111 on the CRT display for an electrode to be used and an electrode to be set for execution of the machining program. In the figure, the electrodes to be used are indicated by "T11", "T12"("T10" is a standard electrode) each indicating an electrode number, and of these the set electrode is indicated by "T11" with the color for the electrode number not inverted to red.

In FIG. 3, reference numeral 121 denotes a display provided by the workpiece displaying means 113 on the CRT display for an electrode to be used and an electrode to be set for execution of the machining program. In the figure, the workpieces to be used can be indicated by W01, W02 each having a color of red or blue. A set workpiece is indicated by W01 having a color of blue.

Figure 5:
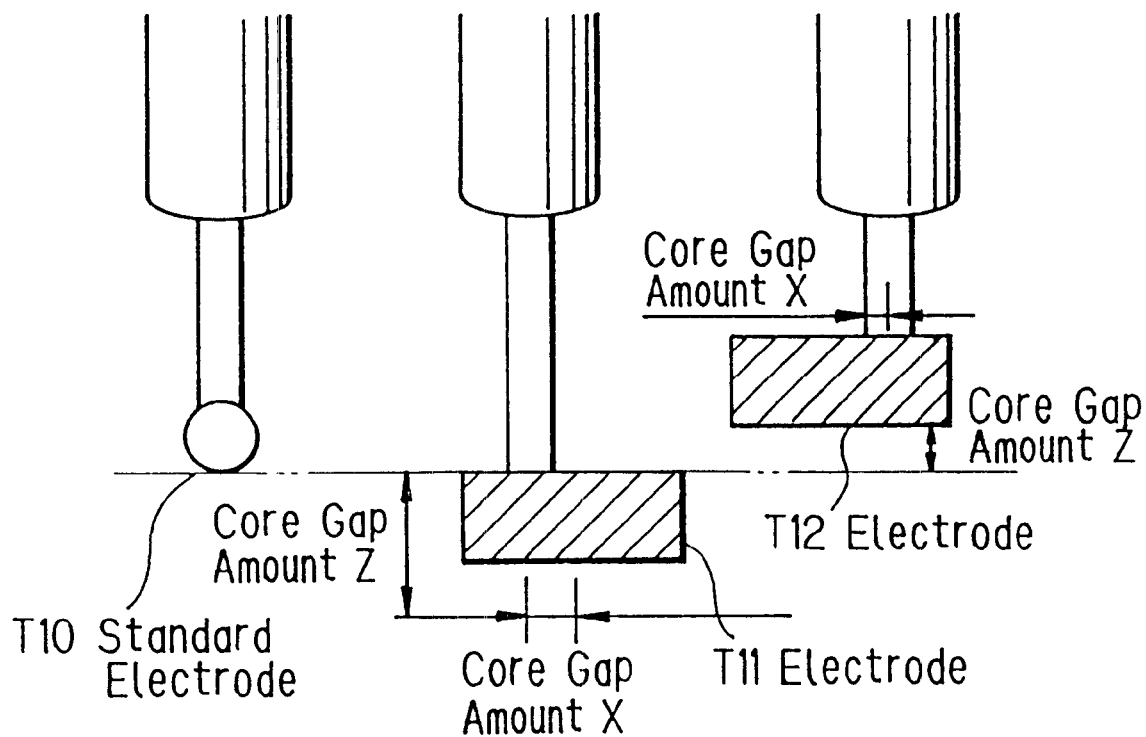
FIG. 5 is a view showing example of the electrode T10, T11 and T21 according to the present invention.

FIG. 4 and FIG. 5 show an embodiment of a method of setting the necessary electrode data according to the present invention. In FIG. 4, reference numeral 122 denotes an electrode data setting display showing a display provided from the electrode data display means 112, said display indicating that the electrode data required for execution of a machining program includes an electrode reduction allowance, an electrode shape, and a displacement of an electrode core, and also that the electrode data has been set for the electrode T11 in the arrangement work piece for electrodes but has not been set for the electrode T12. FIG. 5 shows an example of the electrode T10, T11 and T12.

Figure 6:
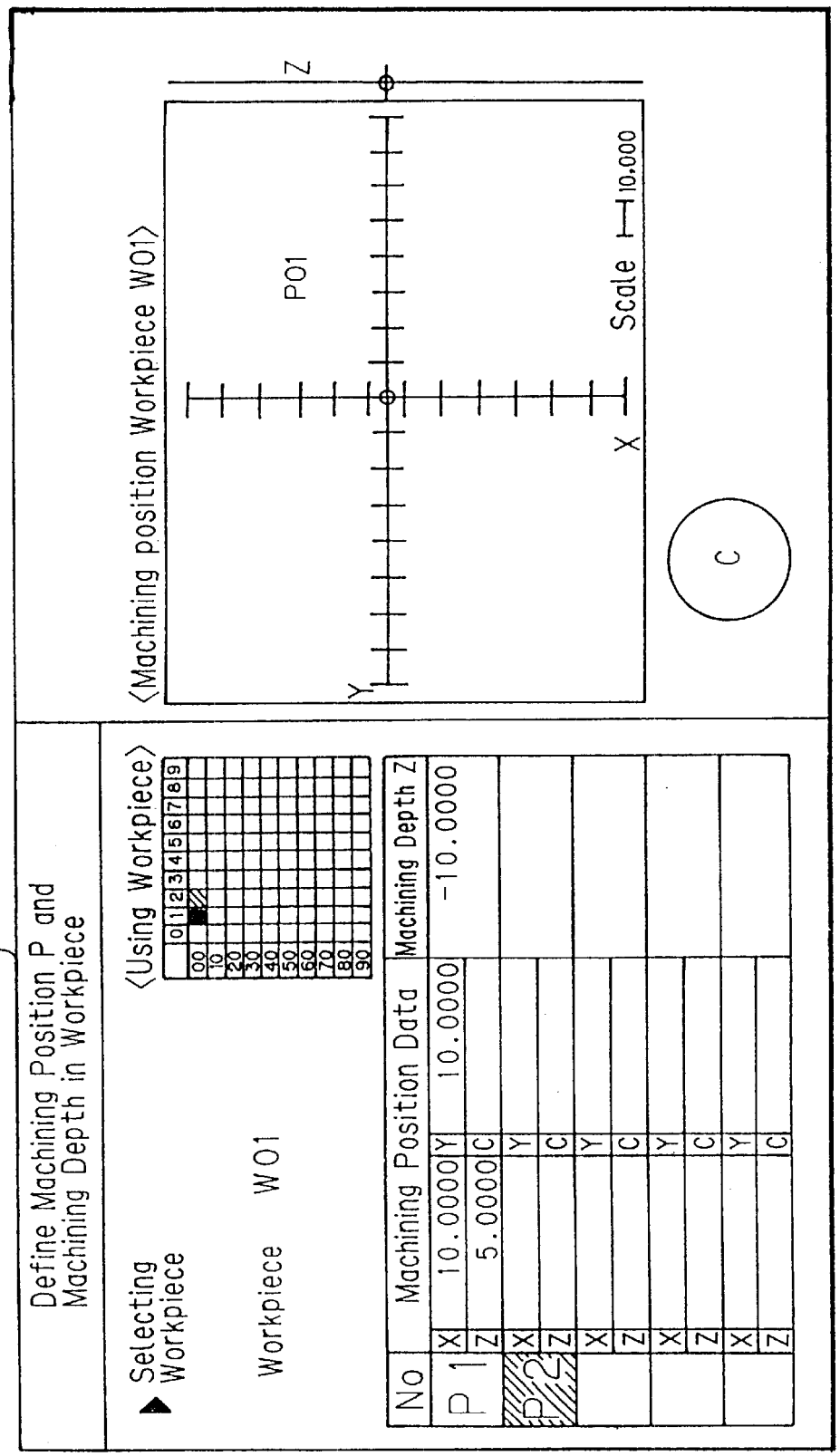
FIG. 6 is a view showing an embodiment of a method of setting necessary workpiece data according to the present invention.

FIGS. 6 and FIGS. 7A and 7B show an embodiment of a method of setting necessary workpiece data according to the present invention. In FIG. 6, reference numeral 124 denotes a workpiece data display screen showing a display provided from the workpiece data displaying means 114, said display indicating that the workpiece data required for execution of the machining program includes a machining position and a machining depth, and also that the workpiece data has been set for a machining position P1 of the workpiece W01 in the house keeping workpiece for workpieces, but has not been set for a machining position P2 thereof. FIG. 7A and FIG. 7B show an example of the workpiece W01, W02.

Figure 8:
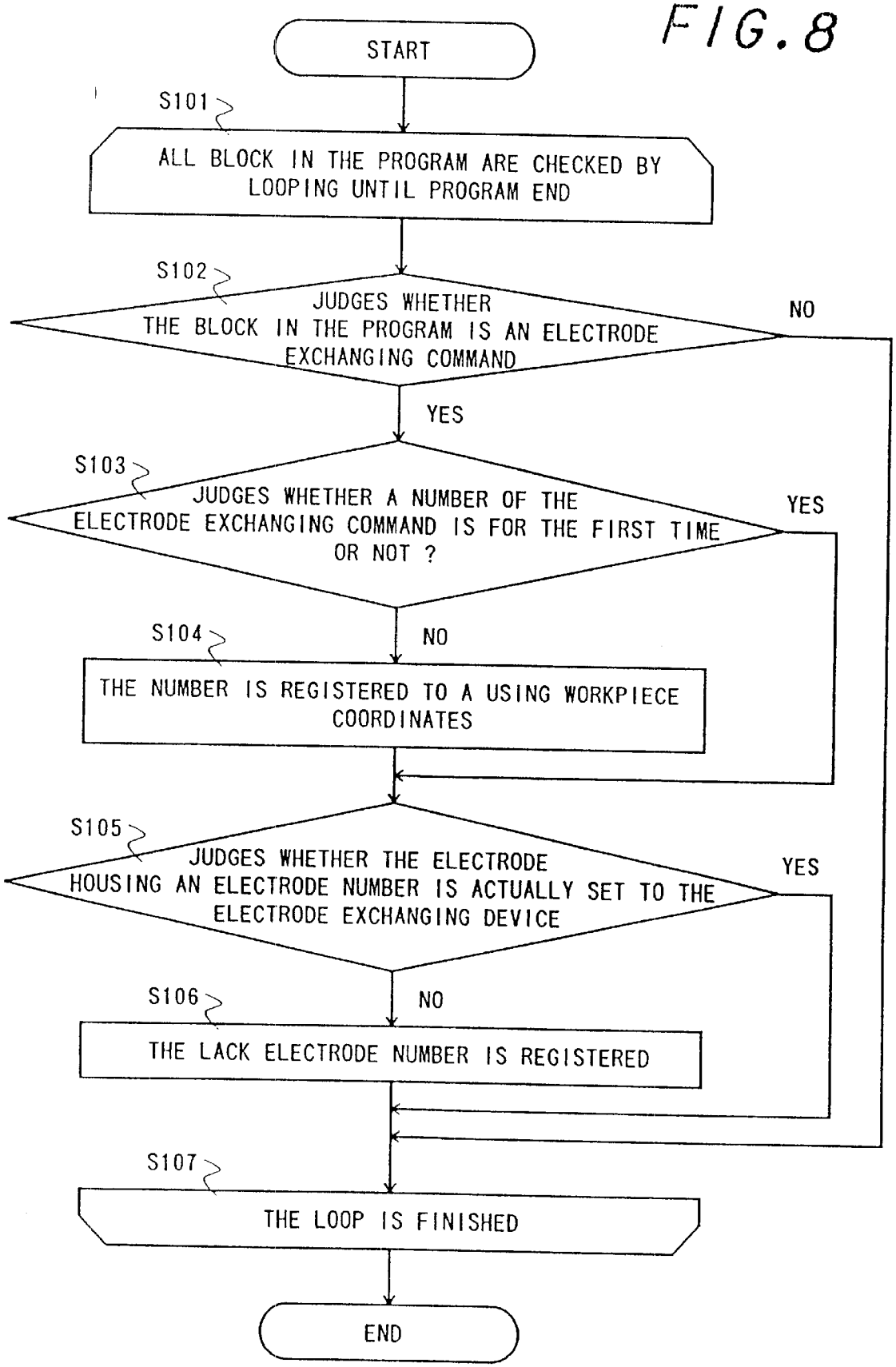
FIG. 8 is a flow chart showing an operation of the using electrode/lack electrode judging means according to the present invention.

FIG. 8 is a flow chart illustrating an operation of the using electrode/lack electrode judging means 102, 103. The operation will be described below with reference to the flow chart shown in FIG. 8.

First, all blocks in the program are checked by looping until program end (S101). Next, the judgment is made as to whether the block in the program is an electrode exchange command (S102). As a result, in case where the block is not the electrode exchanging command, the loop is finished (S107), in case where the block is the electrode exchanging command, judgment is then made as to whether a number of the electrode exchanging command is issued for the first time or not (S103). As a result, in case where the number is not one issued for the first time, the program shifts to step S105, because the number has already been registered as an electrode to be used. In a case where the number is one issued for the first time, the number is registered at the used workpiece coordinates (S104). In this step, all the electrode numbers issued are registered, and the using electrode judging means 102 is realized by referring to the registered data. Next, judgment is made as to whether the electrode having the electrode number specified by the electrode set detecting means 101 has actually been set in the electrode exchanging device 10 or not (S105). In case where the electrode has not been set, the lack electrode number is registered (S106). The lack electrode judging means 103 is realized by referring to the registered data.

Figure 9:
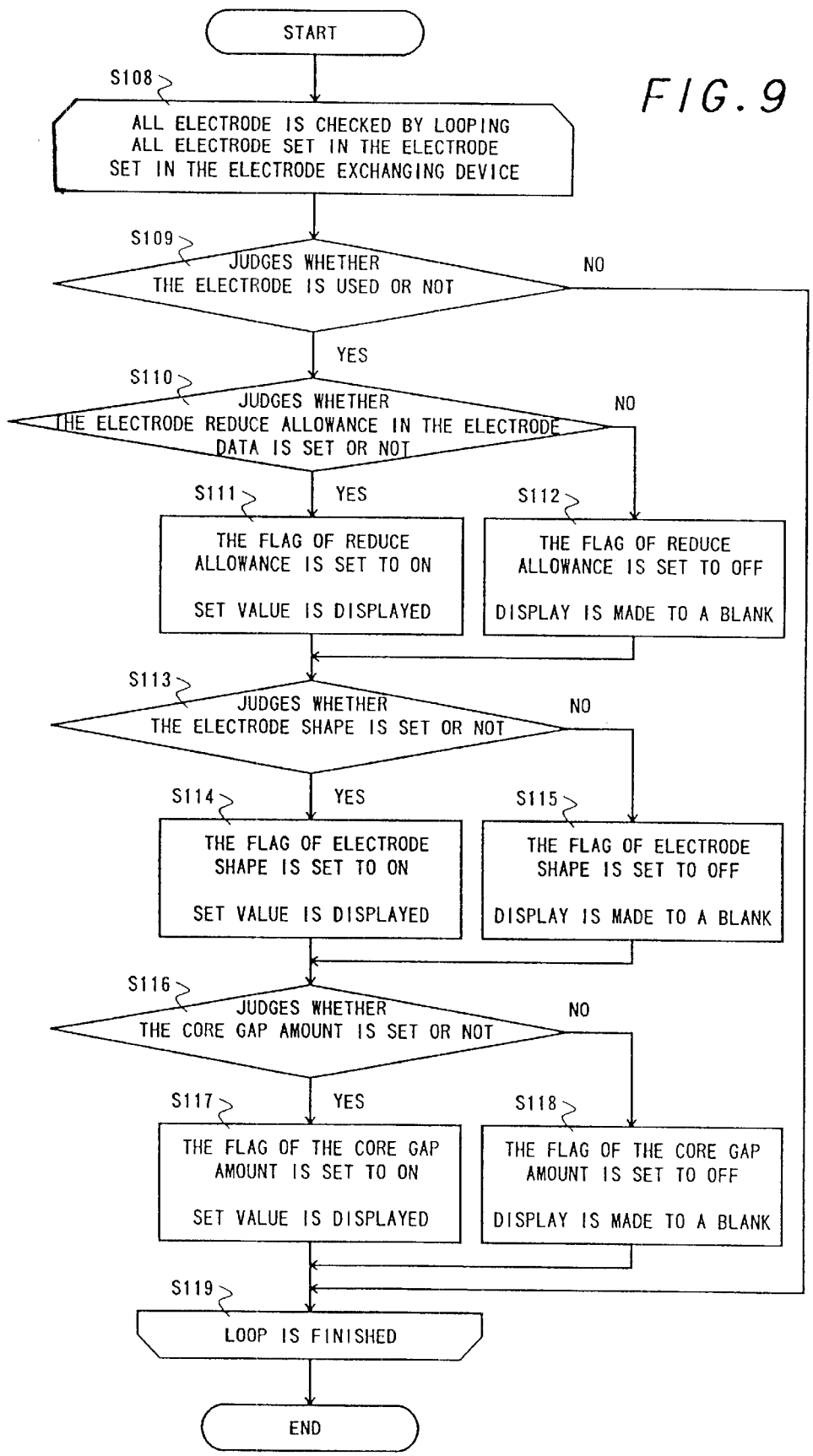
FIG. 9 is a flow chart showing an operation of the electrode data set detecting means according to the present invention.

FIG. 9 is a flow chart illustrating an operation of the electrode data set detecting means 105. operation of the electrode data set detecting means 105 is described below with reference to the flow chart shown in FIG. 9. First, all electro des are checked by looping all electrodes set in the electrode exchanging device (S108). Next, the detecting means 105 judges whether th e electrode is used or not in the program by the using electrode judging means 102 (S109). In case where the electrode is not used, the next electrode is checked because the electrode data of the electrode is not necessary. In case where the electrode is used, the detecting means 105 checks whether each data is set or not because the electrode data of the electrode is necessary (not shown).

Next, the detecting means 105 judges whether the electrode reduce allowance in the electrode data is set or not (S110), and in case where the electrode reduce allowance is set, the flag of reduce allowance is set to ON, and the set value is displayed (S111). In case where the electrode reduce allowance is not set, the flag of reduction allowance is set to OFF, and the display of the set value is made to a blank (S112).

Thereafter, the detecting means 105 judges whether the electrode shape is set or not in the electrode data (S113), and in case where the electrode shape is set, the flag of electrode shape is set to ON, and the set value is displayed (S114). In case where the electrode shape is not set, the flag of electrode shape is set to OFF, and the display of the set value is made to a blank (S115).

Thereafter, the detecting means 105 judges whether the core gap amount is set or not (S116) in the electrode data, and in case where the core gap amount is set, the flag of the core gap amount is set to ON, and the set value is displayed (S117). In case where the core gap amount is not set, the flag of the core gap amount is set to OFF, and the display of the set value is made to a blank (S118). Thereafter, the loop is finished (S119).

As described above, the electrode data set detecting means 105 is realized by judging whether each electrode data is set or not.

Figure 10:
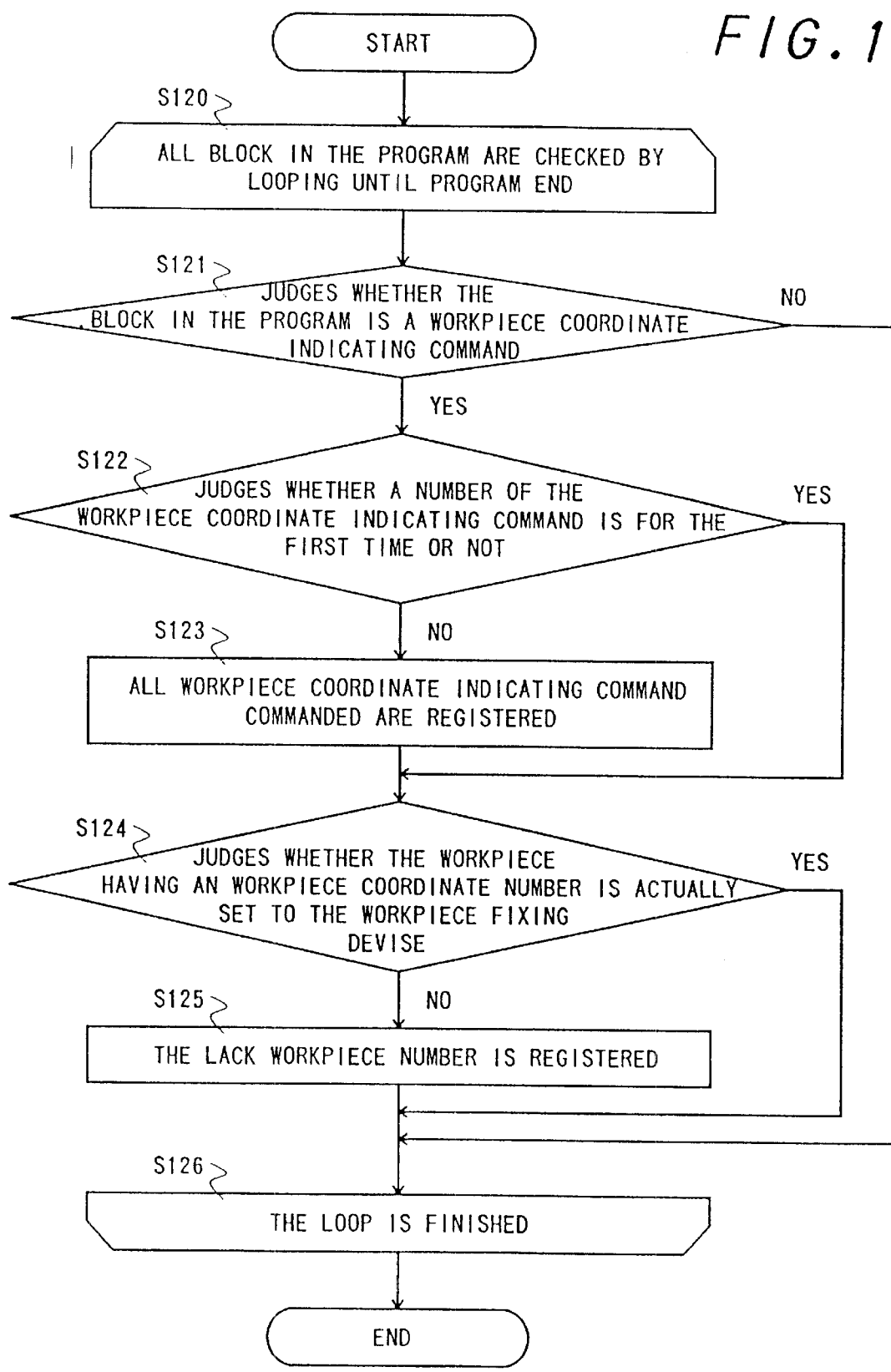
FIG. 10 is a flow chart showing an operation of the using workpiece/lack workpiece judging means according to the present invention.

FIG. 10 is a flow chart illustrating an operation of the using workpiece/lack workpiece judging means 107, 108. This operation will be described below with reference to FIG. 10 and also referring to the example of a conventional program shown in FIG. 12.

First, all block in the program are checked by looping until program ends (S120). Next, the judging means judges whether the block in the program is a workpiece coordinates specifying command (like step S4, step S18, step S34 and step S48 in FIG. 12) or not (S121). In case where the block is not the workpiece coordinates specifying command, the loop is finished (S126). In case where the block is the electrode exchanging command, the judging means judges whether a number of the workpiece coordinates specifying command is issued for the first time or not (S122). In case where the number is not the one issued for the first time, the program shifts to the step S124, because the number has already been registered as that for a workpiece to be used. In case where the number is the one issued for the first time, all workpiece coordinates specify command issued are registered (S123). (S126).

The using workpiece judging means 107 is realized by referring to the registered data, Next, the judging means judges whether the workpiece having workpiece coordinate number Issued from the workpiece set detecting means 106 is actually set to the workpiece fixing device 3 (S124) or not. In case where the workpiece is not actually set, the lack workpiece number is registered (S125). The lack workpiece judging means 108 is realized by referring to the registered data. Thereafter, the loop is finished (S126).

Figure 11:
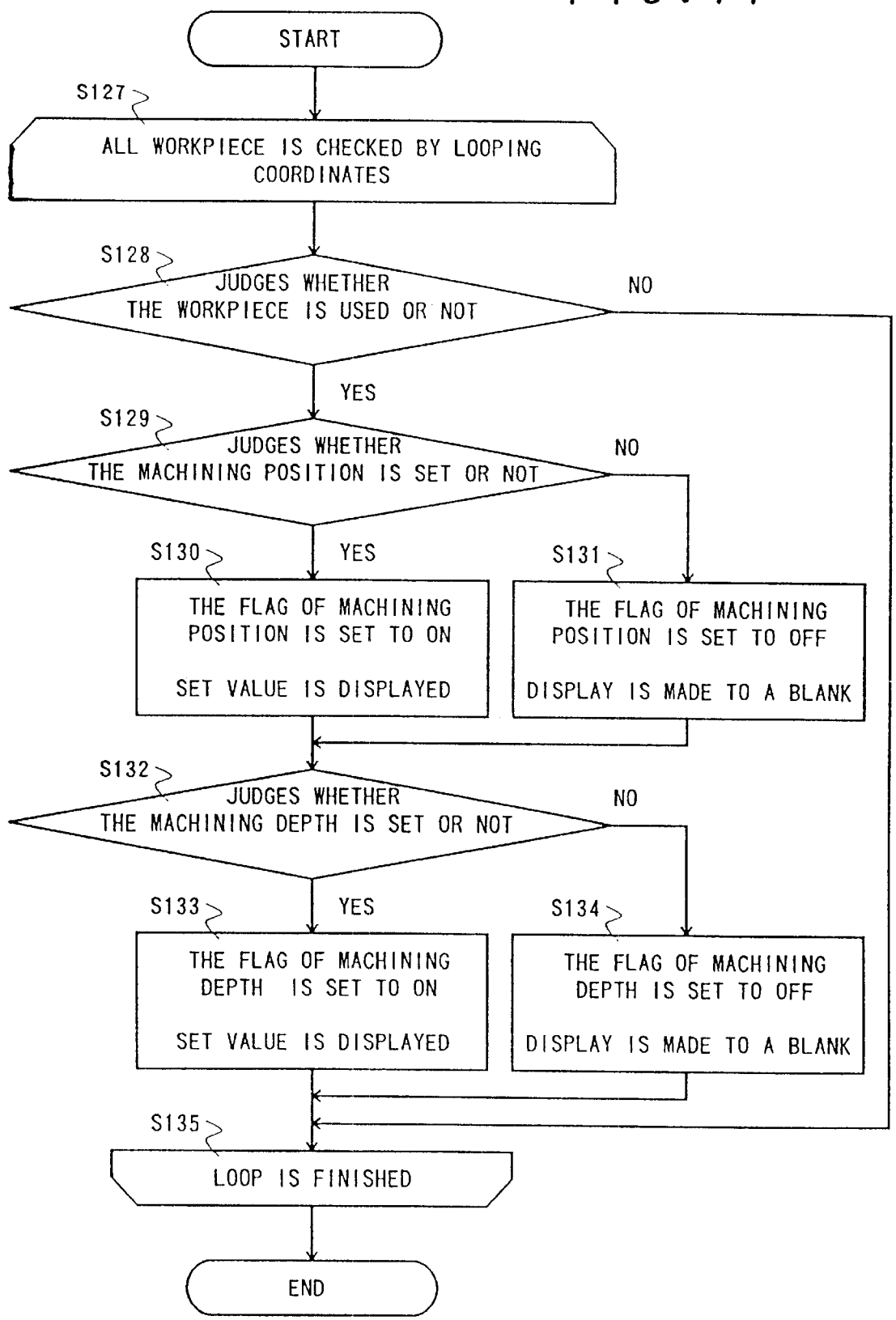
FIG. 11 is a flow chart showing an operation of the workpiece data set detecting means according to the present invention.

FIG. 11 is a flow chart illustrating an operation of the workpiece data set detecting means 110. First, all workpieces are checked by looping the workpiece coordinates (S127). Next, the detecting means judges whether the workpiece is being used or not in the program by the using workpiece judging means 107 (S128). In case where the workpiece is not used, the next workpiece is checked because the workpiece data of the workpiece is not necessary. In case where the workpiece is used, the detecting means checks whether each data is set or not because the workpiece data of the workpiece is necessary.

Next, the detecting means 110 judges whether the machining position in the workpiece data is set or not (S129), and in case where the machining position is set, the flag of machining position is set to ON, and the set value is displayed (S130). In case where the machining position is not set, the flag of machining position is set to OFF, and the display of the set value is made to a blank (S131).

Thereafter, the detecting means 110 judges whether the machining depth is set or not (S132) in the workpiece data, and in case where the machining depth is set, the flag of machining depth is set to ON, and the set value is displayed (S133). In case where the machining depth is not set, the flag of machining depth is set to OFF, and the display of the set value is made to a blank (S134). Thereafter, the loop is finished (S135).

As described above, the workpiece data set detecting means 110 is realized by judging whether each workpiece data is set or not.

Figure 12:
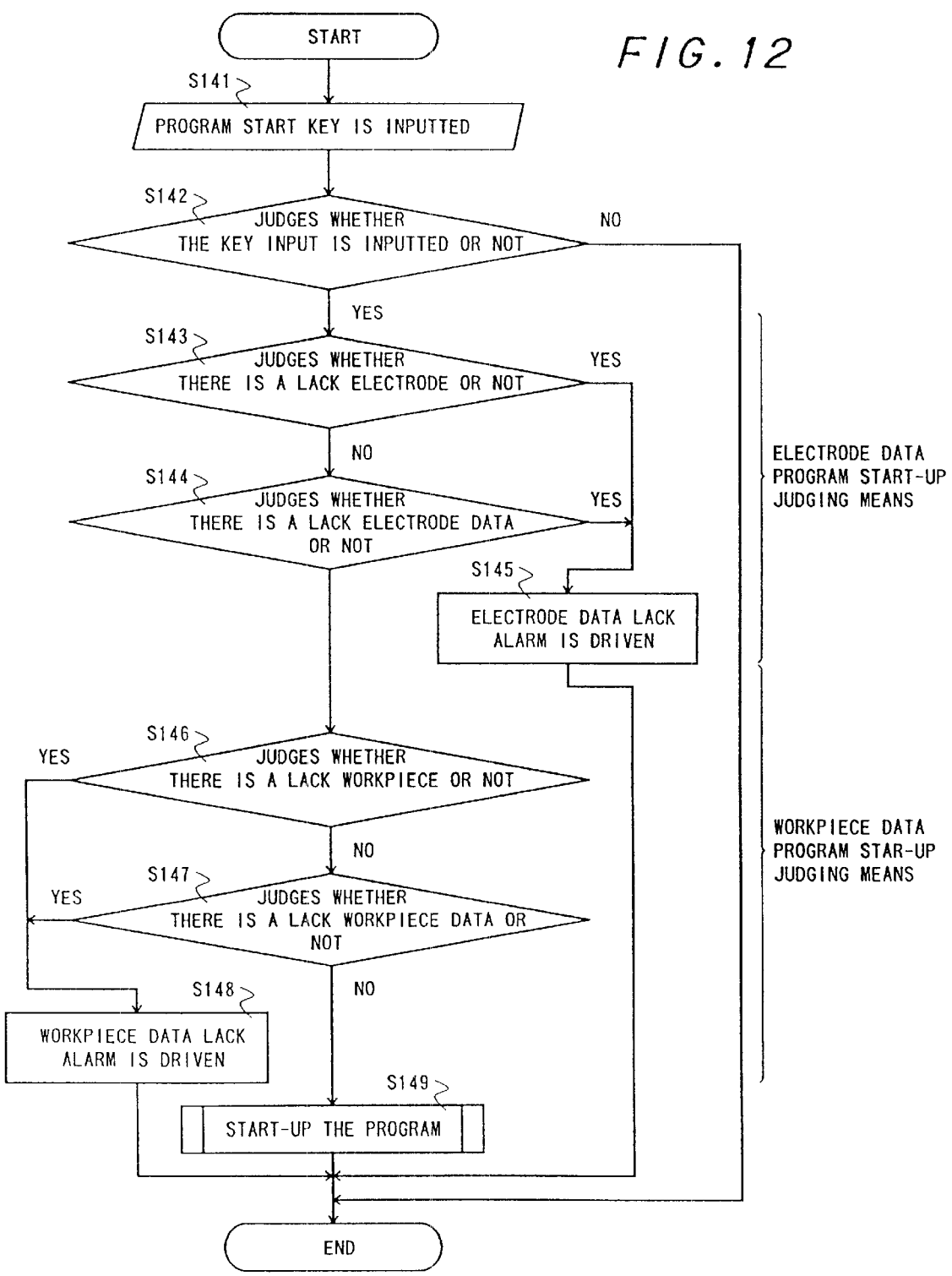
FIG. 12 is a flow chart showing an operation of the electrode data program start-up judging means and that of workpiece data program start-up judging means according to the present invention.

FIG. 12 is a flow chart illustrating an operation of the electrode data program start-up judging means 115, and that of workpiece data program start-up judging means 116. Operation of the program start-up judging means will be described below with reference to the flow chart shown in FIG. 12.

Key entry from the program start key 26 is accepted (S141). Next, the judging means judges whether the key entry has been accepted or not (S142). In case where the key entry has been accepted, the judging means judges whether there is any lack of electrode or not in accordance with the result of the lack of electrode judging means 103 (S143). In case where there is any lack of electrode, the alarm indicating lack of electrode data is generated (S145). In case where there is not any lack of electrode, the lack of electrode data analyzing means 105 judges whether there is any lack of electrode data (S144) or not. In case where there is any lack of electrode data, the alarm indicating lack of electrode data is generated (S145). As described above, the electrode data program start-up judging means is realized in steps S142 to S145.

Next, the judging means judges whether there is any lack of workpiece or not by referring to the result of the lack of workpiece judging means 108 (S146). In case where there is any lack workpiece, the alarm indicating lack of necessary workpiece data is generated (S148). In case where there is not any lack workpiece, the lack workpiece data analyzing means 110 judges whether there is any lack workpiece data or not (S147). In case where there is any lack workpiece data, the alarm indicating lack of necessary workpiece data is generated (S148). As described above, the workpiece data program start-up judging means is realized in steps S146 to S148. Thereafter, the judging means judges that all of necessary electrode data and workpiece data have been set, and issues an instruction to start execution of the program to the operation command analyzing means 23 (S149).

In description of presently preferred embodiments above, use of an NC program is assumed, but it is also allowable to use a simple machining program other than an NC program.

Figure 13:
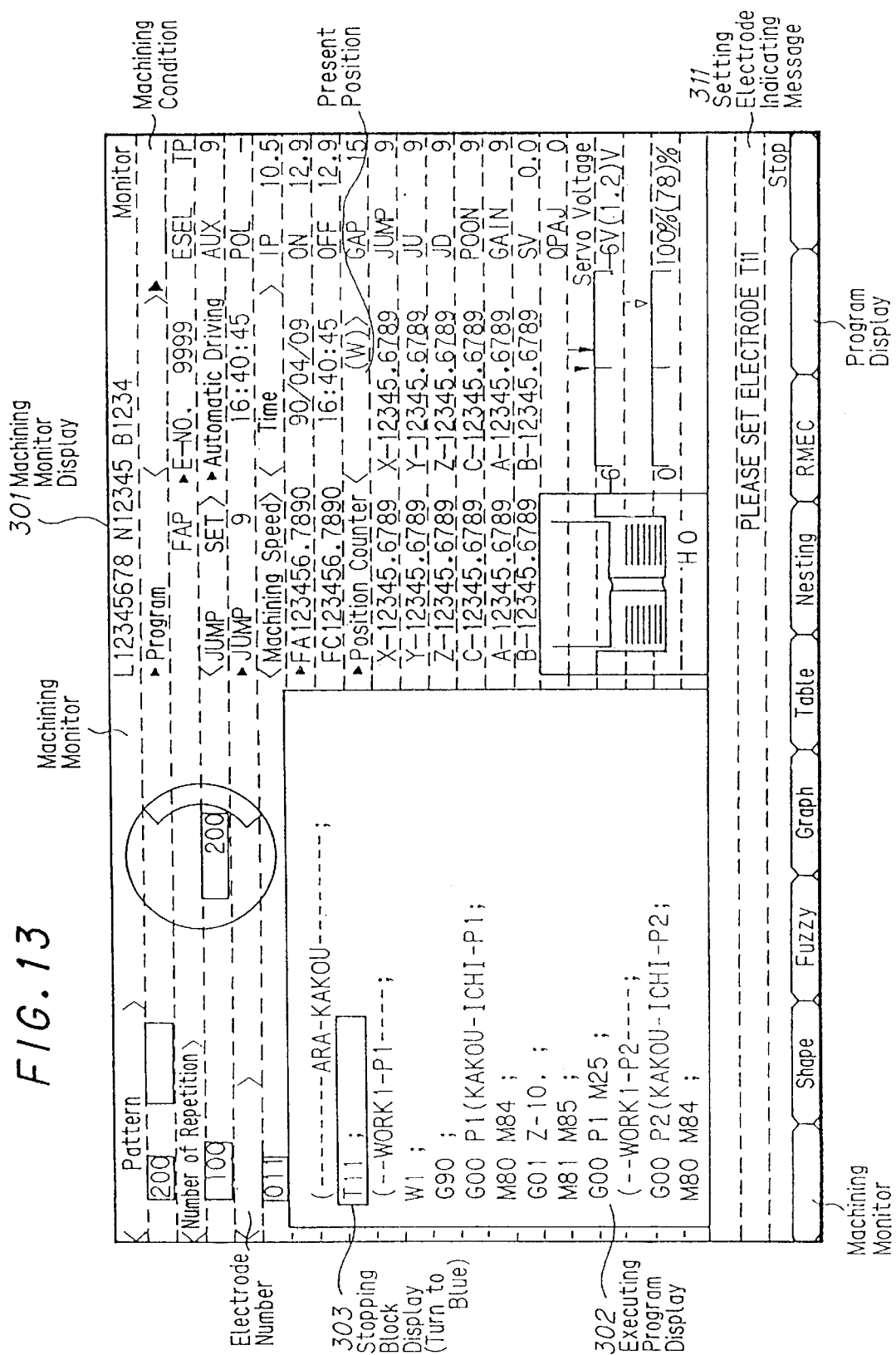
FIG. 13 is a view showing an embodiment of the electrode set indicating means according to the present invention.

FIG. 13 shows an embodiment of the electrode set indicating means 117 according to the present invention. In the figure, reference numeral 301 denotes a display for monitoring the execution of the program, numeral 302 denotes a display showing that the conventional type of the machining program 45 is now being executed. Numeral 303 denotes display showing that the block in execution is the electrode exchanging command of T11 and the operation is stopped at the current program step. And, numeral 311 denotes a display showing the block has been stopped because the electrode T11 is not set, and the message "PLEASE SET ELECTRODE T11" for prompting an operator to set the electrode T11 is preceded.

Figure 14:
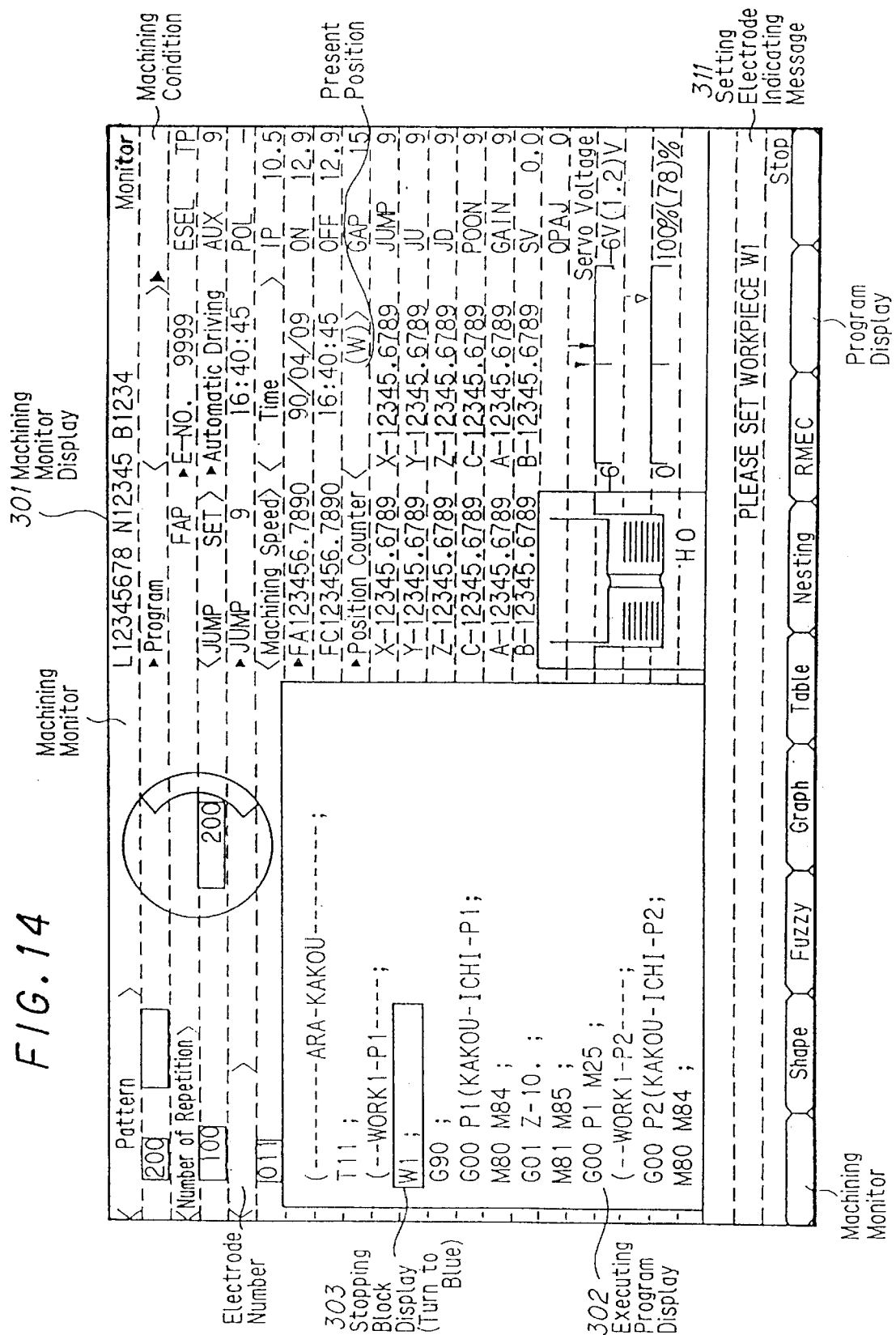
FIG. 14 is a view showing an embodiment of the workpiece set indicating means according to the present invention.

FIG. 14 shows an embodiment of the workpiece set indicating means 118 according to the present invention. In the figure, reference numeral 301 and 302 are the same as those used to illustrate the electrode set indicating means shown in FIG. 13. Reference numeral 303 denotes a display showing that the block in execution in the workpiece coordinate command of W1, and the operation has been stopped at the current program step. And, numeral 311 denotes a display indicating that execution of the program block has been stopped because the workpiece W1 is not set, and the message "PLEASE SET WORKPIECE W1" for prompting an operator to set the workpiece W1 is given.

Figure 15:
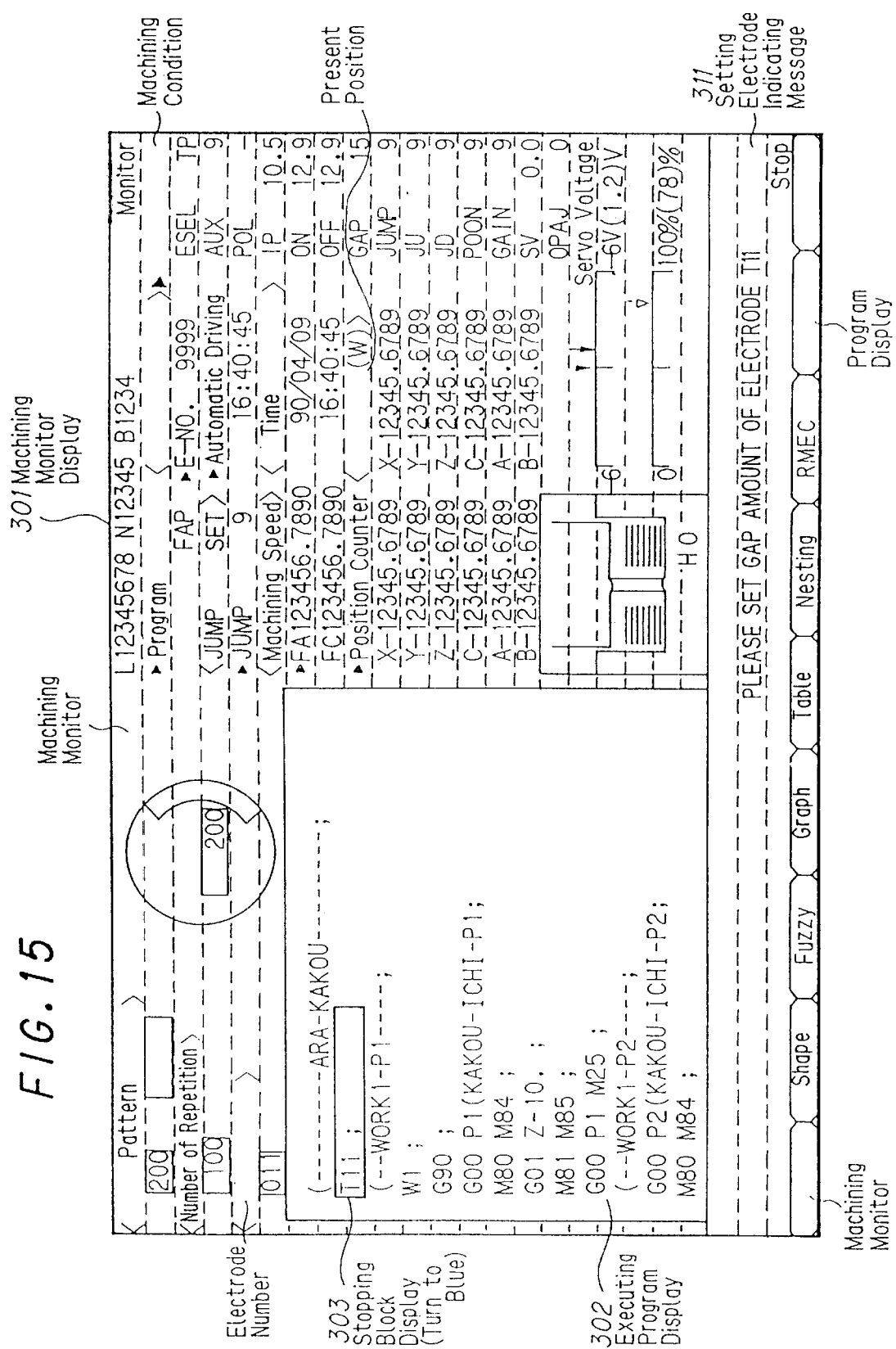
FIG. 15 is a view showing an embodiment of the electrode data set indicating means according to the present invention.

FIG. 15 shows an embodiment of the electrode data set indicating means 119 according to the present invention. In the figure, reference numeral 301, 302 and 303 are the same as those to illustrate the electrode set indicating means shown in FIG. 13. In FIG. 15, and, numeral 311 denotes a display indicating that execution of the program block has been stopped because electrode core gap amount of the electrode T11 is not set, and the message "PLEASE SET GAP AMOUNT OF ELECTRODE T11" for urging an operator to set the core gap of the electrode T11 is given.

Figure 16:
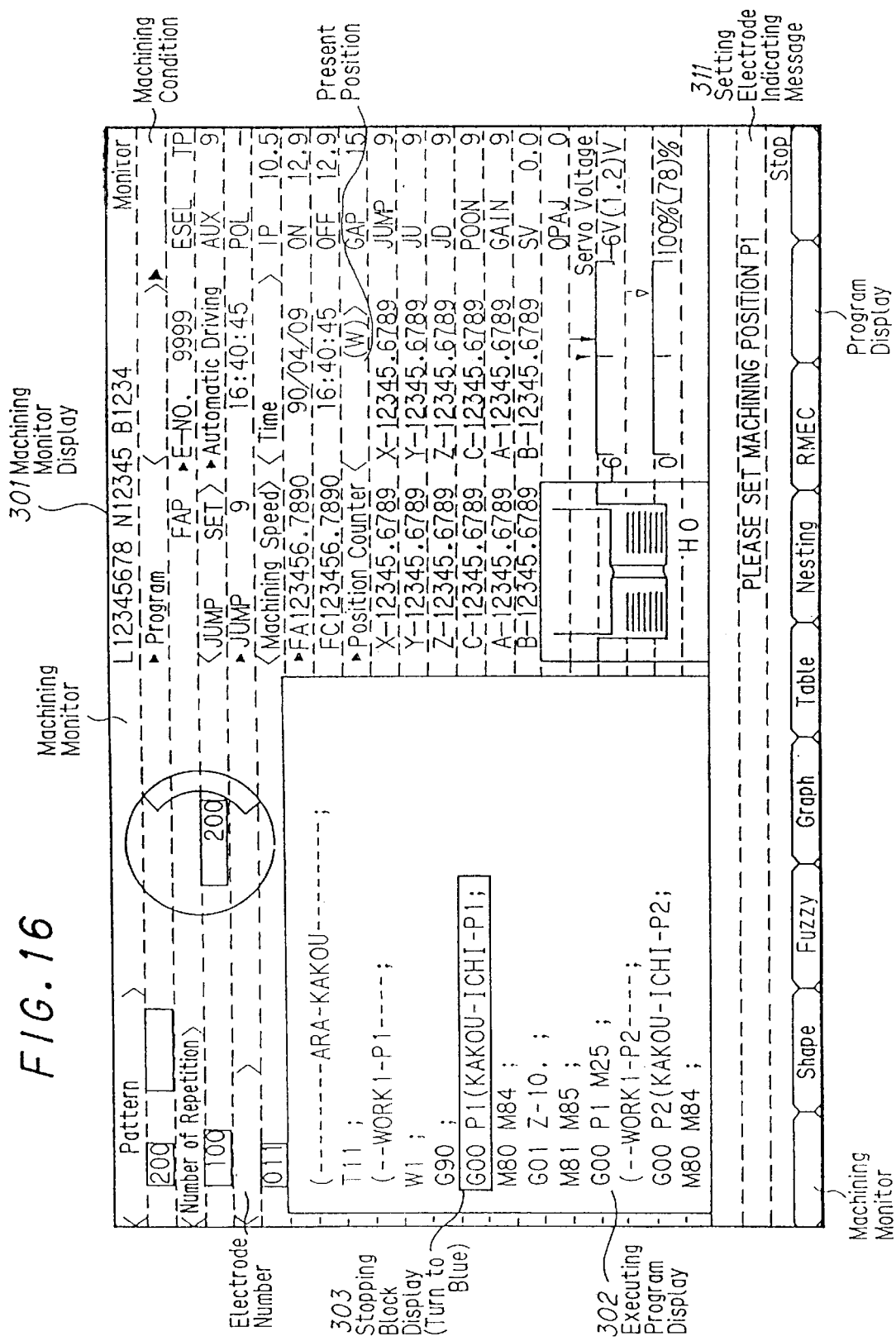
FIG. 16 is a view showing an embodiment of the workpiece set indicating means according to the present invention.

FIG. 16 shows an embodiment of the workpiece set indicating means 120 according to the present invention. In the figure, reference numeral 301 and 302 are the same as those used to illustrate the workpiece set indicating means shown in FIG. 14. In FIG. 16, reference numeral 303 denotes a display indicating that the block in execution is the command to move the block in execution to the machining position P1 in the workpiece and the operation has been stopped at the current program stop. And, numeral 311 denotes a display indicating that execution of the program block has been stopped because the machining position P1 is not set, and the message "PLEASE SET MACHINING POSITION P1" for prompting an operator to set the machining position P1 is given.

Next, another embodiment of the present invention is described below. FIG. 17 is a block diagram illustrating a general configuration of the electric discharge machining apparatus according to the present invention. Reference numeral 201 denotes an electrode, numeral 202 denotes a table, numeral 203a denotes a workpiece having workpiece number 11, numeral 203b denotes a workpiece having a workpiece number 12, numeral 203c denotes a workpiece having a workpiece number 13, numeral 204a denotes a workpiece fixing device for fixing the workpiece 203a on the table 202, numeral 204b denotes a workpiece fixing device for fixing the workpiece 203b on the table 202, numeral 204c denotes a workpiece fixing device for fixing the workpiece 203c on the table 202, numeral 205 and 206 denote a motor for moving the table 202 to the X, Y directions, numeral 207 denotes a spindle with the electrode 201 set therein, numeral 208 denotes a motor for moving the spindle 207, numeral 209 denotes a move controlling device for moving the motor 205, the motor 206 and the motor 208, numeral 210 denotes a memory for outputting mechanical coordinates for the electrode 201, numeral 211 denotes an NC program including a workpiece exchanging command, numeral 212 denotes a program analyzing device for analyzing the NC program 211, numeral 213 denotes a workpiece exchange controlling device for controlling exchange of workpieces.

Reference numeral 214 denotes a memory storing therein the number of the workpiece which is newly carried in. Numeral 215 denotes a workpiece exchange device for executing the workpiece (workpiece 203a, workpiece 203b or workpiece 203c) fixed on the table 202 on the exchanging position with the workpiece fixing device (workpiece fixing device 201a, workpiece fixing device 204b or workpiece fixing device 204c), and for carrying in the workpiece (workpiece 203a, workpiece 203b or workpiece 203c) corresponding to the workpiece number stored in the memory 214 with the workpiece fixing device (workpiece fixing device 204a, workpiece fixing device 204b or workpiece fixing device 204c), and for fixing. Numeral 216 denotes a computing device for computing the machining coordinates of the electrode 201.

Reference numeral 217 denotes a memory for storing coordinates of the electrode in the coordinate system in which a reference point for each workpiece is regarded as origin. Numeral 218 denotes a memory for storing the mechanical coordinates of the reference point in the workpiece fixing device 204. Numeral 219 denotes a memory for storing workpiece data for the workpiece on the table 202. Numeral 220 denotes a memory for storing the data in the memory 230 when the exchange of workpiece is started. Numeral 221 denotes a memory for storing the machining coordinates previously stored for exchanging workpieces. Numeral 222 denotes a memory for storing workpiece data corresponding to each workpiece. Numeral 223 denotes an NC control device, and numeral 290 denotes a display device.

Figure 18A:
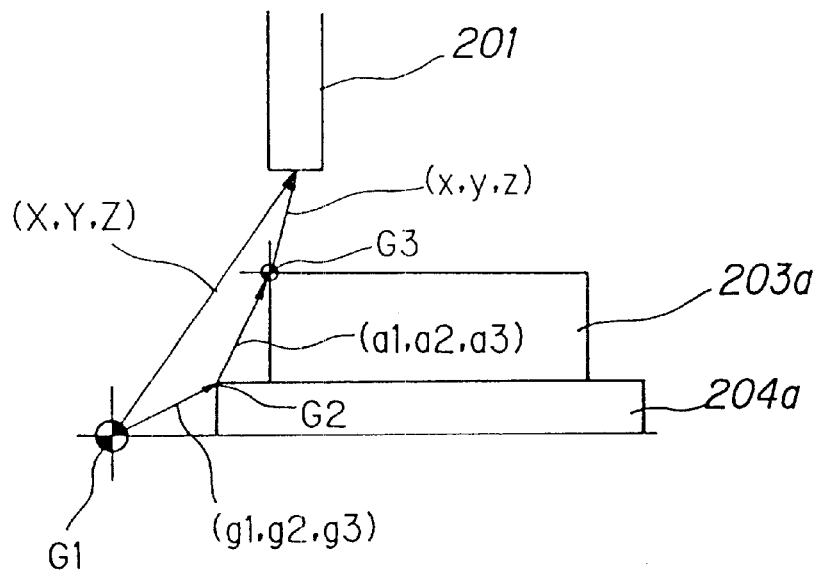
FIG. 18A is a view showing a positional control for the electrode and the table in the computing device according to the present invention.
Figure 18B:
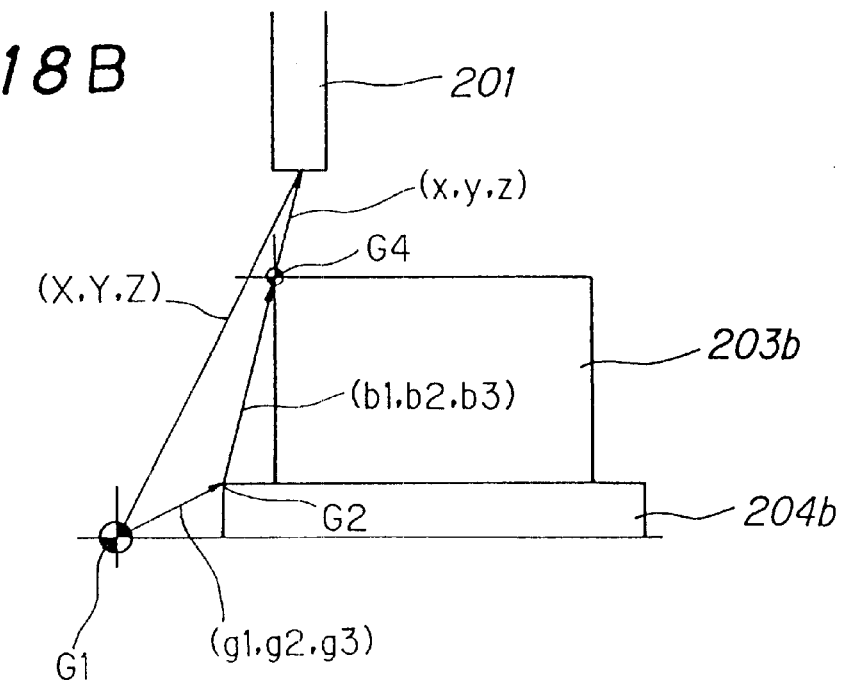
FIG. 18B is a view showing a positional control for the electrode and the table in the computing device according to the present invention.

FIGS. 18A and 18B are a views each illustrating positional control for the electrode 201 and the table 202 in the computing device 216. G1 is a machine origin specific to the machine, G2 is a reference point for each of the workpiece fixing devices 204a, 204b,(g1, g2, g3) are coordinate values of G2 in the machine coordinate system having the machine origin G1 as an origin thereof, and is a workpiece offset of coordinate system (hereinafter referred to as "G2 coordinate system") having the reference point G2, G3 as a reference point on the workpiece 203a. Also, (a1, a2, a3) are coordinates of G3 in the coordinate system G2, (x, y, z) are coordinates of the electrode 1 in the coordinate system G3, (X, Y, Z) are coordinates of the electrode 1 in the machine coordinate system, G4 is a reference point on the workpiece 203b, (b1, b2, b3) are coordinates of G4 in the coordinate system G2. Accordingly, expressions 2 and 3 are formed among the above values. In case where a program, which is set according to relative positions (x, y, z) of the electrode 1 to the standard point to a workpiece having a different shape control, can be executed by changing the coordinates of the reference point on the workpiece in G2 coordinate system, the following apply:

$$(X, Y, Z) = (x, y, z) + (g1, g2, g3) + (a1, a2, a3) \quad \text{(EXPRESSION 2)}$$

$$(X, Y, Z) = (x, y, z) + (g1, g2, g3) + (b1, b2, b3) \quad \text{(EXPRESSION 3)}$$

FIGS. 19A, B are views illustrating the contents of the NC program 211. FIG. 19A shows a main program, wherein B1 and B6 are block each indicating a command for calling out the program of L100 by each block which is commanded between G66.1 to G67, B2 is a block indicating a command for setting the workpiece of No. 11, B3 is a block indicating a command for exchanging and setting the workpiece of No. 12, B4 is a block indicating a command for exchanging and setting the workpiece of No. 13, B5 is a block indicating a command for exchanging and setting the workpiece of No. 14, and B6 is a block indicating an end of the program.

FIG. 19B shows a sub program, wherein B10 is a block indicating a level of the sub program L100, B11 is a block indicating a command for setting a dielectric and a machining to ON, B12 is a block indicating a command of machining from a reference point of the workpiece to the position by 4.9 mm therefrom in the direction of Z-axis, B13 is a block indicating a command of machining from a reference point of the workpiece to the position by 4.95 mm therefrom in the direction of Z-axis, of Z-direction 4.95 mm, B14 is a block indicating a command for setting a dielectric and a machining to OFF, B15 is a block indicating movement from a reference point on the workpiece to the position by 5.00mm therefrom in the direction of Z-axis, B16 is a block indicating a command for return to the main program, which executes the machining program in the sub program each time a workpiece is exchanged.

Next, the operation will be described. When an operator gives an instruction for start of the program, the program analyzing device 212 starts analysis of the NC program 211. When the block B2 indicating a command for exchanging the workpiece No. 11 sent from the NC program 211 is detected, the program analyzing device 212 issues a workpiece exchange signal to the workpiece exchange controlling device 213, and stores the number of the workpiece being exchanged under the workpiece exchange command in the memory 214.

The workpiece exchange controlling device 213 outputs a workpiece exchange position move command to the computing device 216. The computing device 216 stores a coordinate values in the memory 217 and in the memory 220, and outputs a workpiece exchange position which is set previously in the memory 221 to the memory 210.

And, the move controlling device 209 outputs a move command to the motor 205, the motor 206 and the motor 208 for moving the table 202 and the spindle 207 to the positions each specified by coordinate values stored in the memory 219. The move controlling device 209 outputs an arrival signal to the computing device 216 when the table 202 and the spindle 207 arrives at the positions specified by coordinate values stored in the memory 219. The computing device 216 outputs an exchange position arrival signal to the workpiece exchange controlling device 213 when the arrival signal is received. The workpiece exchange controlling device 213 issues a workpiece exchange start command to the workpiece exchange device 215 when the exchange position arrival signal is received.

The workpiece exchange device 215 carries out the workpiece 203a on the table 202 with the workpiece fixing device 204a upon input of the workpiece exchange start command, fixes the workpiece 203b having an exchange workpiece number stored in the memory 214 with the workpiece fixing device 204a on the table 202, and issues a workpiece exchange end signal to the workpiece exchange controlling device 213. The workpiece exchange controlling device 213 outputs a return command to the computing device 216. The computing device 216 stores the workpiece data corresponding to a workpiece number in the memory 219 from the memory 222, memorizes the coordinates in the memory 220, and figures out the sum of the data in the memory 217, the memory 218 and the memory 219, thereafter outputs the sum to the memory 210.

The move controlling device 209 outputs a movement command to the motor 205, the motor 206 and the motor 208 for moving the table 20 2 and the spindle 207 to the positions each specified by coordinates stored in the memory 210, the move controlling device 209 outputs an arrival signal to the computing device 216, when the table 202 and the spindle 207 arrive at the positions each specified by coordinates stored in the memory 210.

The computing device 216 outputs a return end signal to the workpiece exchange controlling device 213, when the arrival signal is inputted. The workpiece exchange controlling device 213 outputs the workpiece exchange end signal to the program analyzing device 212, when the workpiece exchange end signal is inputted.

The program analyzing device 212 executes the sub program L100 by the block b1, when the workpiece exchange end signal is received. When program analyzing device 212 reads the block B11, the device outputs a signal a dielectric ON and the machining ON to the power source, then the processing of B11. Next, the program analyzing device 212 reads the block B12, and outputs the movement command for moving to the position by 4.9 mm afar in the direction of Z-axis to the computing device 216. The computing device 216 stores the data in the memory 217, when the movement command for moving to the position by 4.9 mm afar in the direction of Z-axis is inputted, and figures out the sum of the data stored in the memory 217, the memory 218 and the memory 219, and outputs the sum to the memory 210.

The move controlling device 209 outputs a movement command to the motor 205, the motor 206 and the motor 208 for moving the table 202 and the spindle 207 to the position specified by coordinates stored in the memory 210. The move controlling device 209 outputs an arrival signal to the computing device 216, when the table 202 and the spindle 207 arrives at the position each specified by coordinates stored in the memory 210. The computing device 216 outputs a movement end signal to the program analyzing device 212, when the computing device 216 inputs the arrival signal. Operations of the block B13 by program analyzing device 212, the computing device 216 and the move controlling device 209 on the block B13 in the NC program 211 are the same as those of the block B11; namely, the machining of −4.95 mm to the reference point of the workpiece 203a is executed to finish the processing at block B13, then block B14 is read, the dielectric OFF signal indicating end of the machining is issued to the power source to finish the processing of B14, then the block B15 is read, and then the system control returns to the main program.

After returning to the main program, the block B3 meaning a workpiece exchanging command No. 12 is read, the workpiece exchange command is issued to the workpiece exchange controlling device 213, the exchange workpiece number in the workpiece exchange command is stored in the memory 214, and thus the program is executed by repeating the processing which is the same as that described above.

Figure 20:
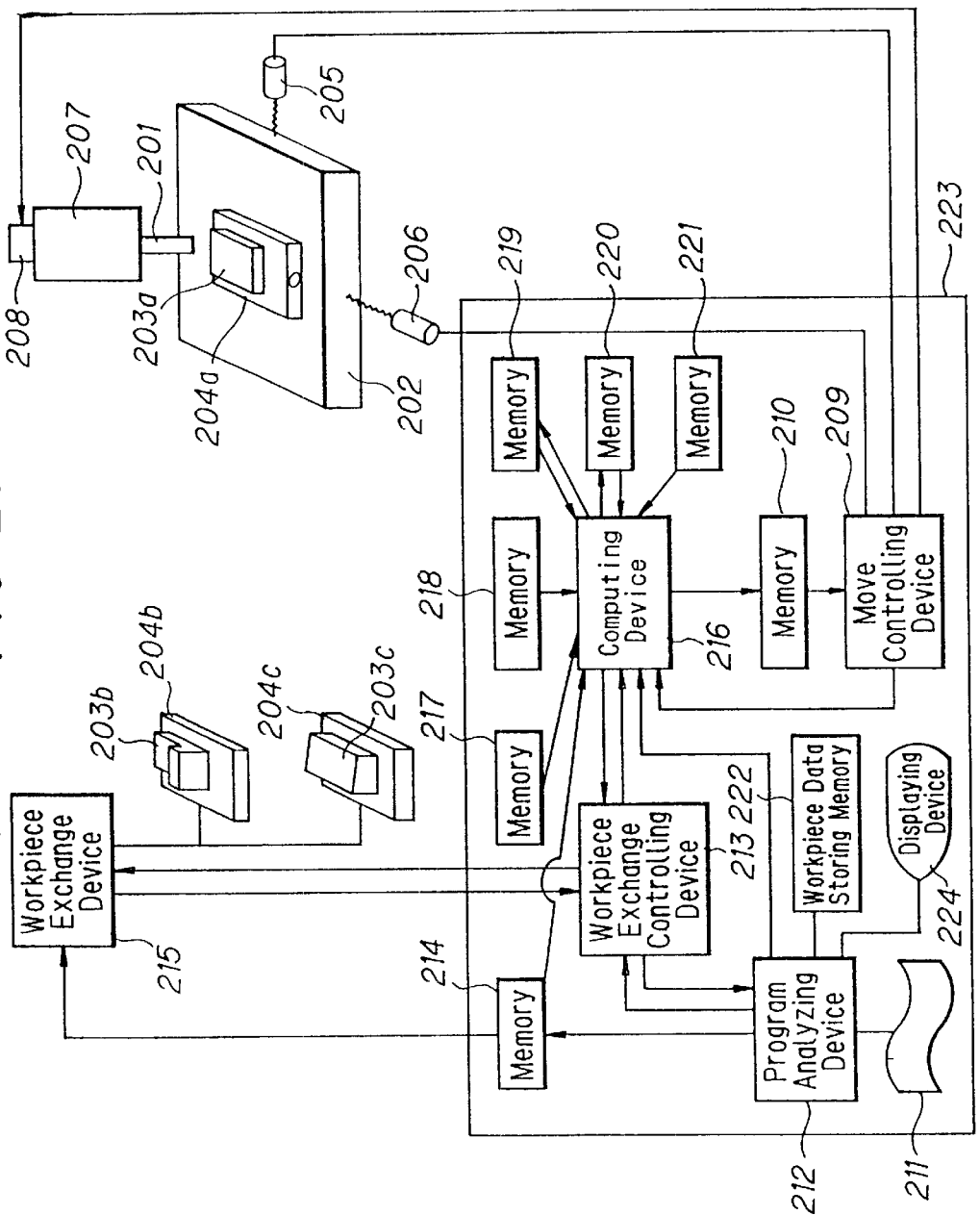
FIG. 20 is a block diagram showing the other embodiment of the electric discharge machining apparatus according to the present invention.

FIG. 20 is a block diagram showing a third embodiment of the electric discharge machining apparatus, according to the present invention. In this figure, reference numeral 224 is a display device for displaying a workpiece number and a message according to a message output command from the program analyzing device 212. Other elements are the same as in FIG. 17.

Figure 21:
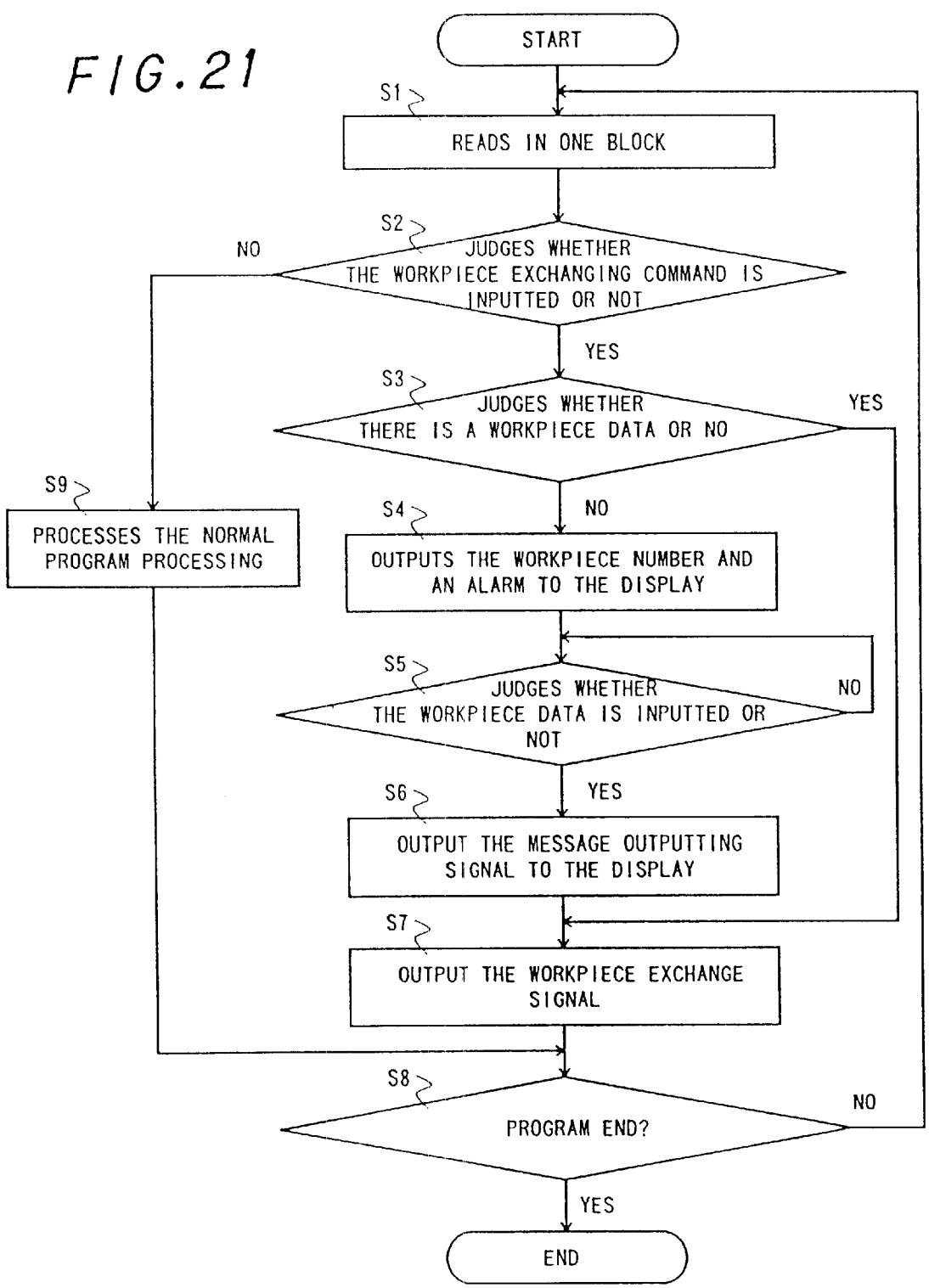
FIG. 21 is a flow chart showing a processing in the program analyzing device in the electric discharge machining apparatus shown in FIG. 20 according to the present invention.

FIG. 21 is a flow chart showing a processing in the program analyzing device 212 in the electric discharge machining apparatus shown in FIG. 20.

Operation will be described below with reference to FIG. 20 and FIG. 21. The program analyzing device 212 starts a program analysis of the NC program 211, upon input of an instruction for program start by an operator. The program analyzing device 212 reads in one block from the NC program 211 (SI), judges whether the workpiece exchanging command has been inputted or not (S2), then judges whether there is a workpiece data having workpiece number for the workpiece to be exchanged in the memory 222 or not by referring to the contents of the memory or not by 222, in case where the workpiece exchanging command is inputted(S3).

The program analyzing device 213 outputs a workpiece exchange signal to the workpiece exchange controlling device 213, in case where there is the workpiece data (S7). On the contrary, in case where there is no workpiece data, the program analyzing device 213 outputs the workpiece number and an alarm outputting command to the display 224 (S4). The display 224 displays a message of "PLEASE INPUT WORK DATA" with the workpiece number.

The program analyzing device 212 judges whether the workpiece data has been inputted to the memory 222 (S5). The program analyzing device 212 stops output of the message outputting signal to the display unit 224, in case where input of the workpiece data is finished(S6), and outputs the workpiece exchange signal to the workpiece exchange controlling device 213 (S7).

In case where the program analyzing device 212 judges that the workpiece exchanging command has not been inputted in the step S2, the common program is executed. Operation after the workpiece exchange controlling device 213 receives the workpiece exchange signal is the same as the operation shown in FIG. 18.

Figure 22:
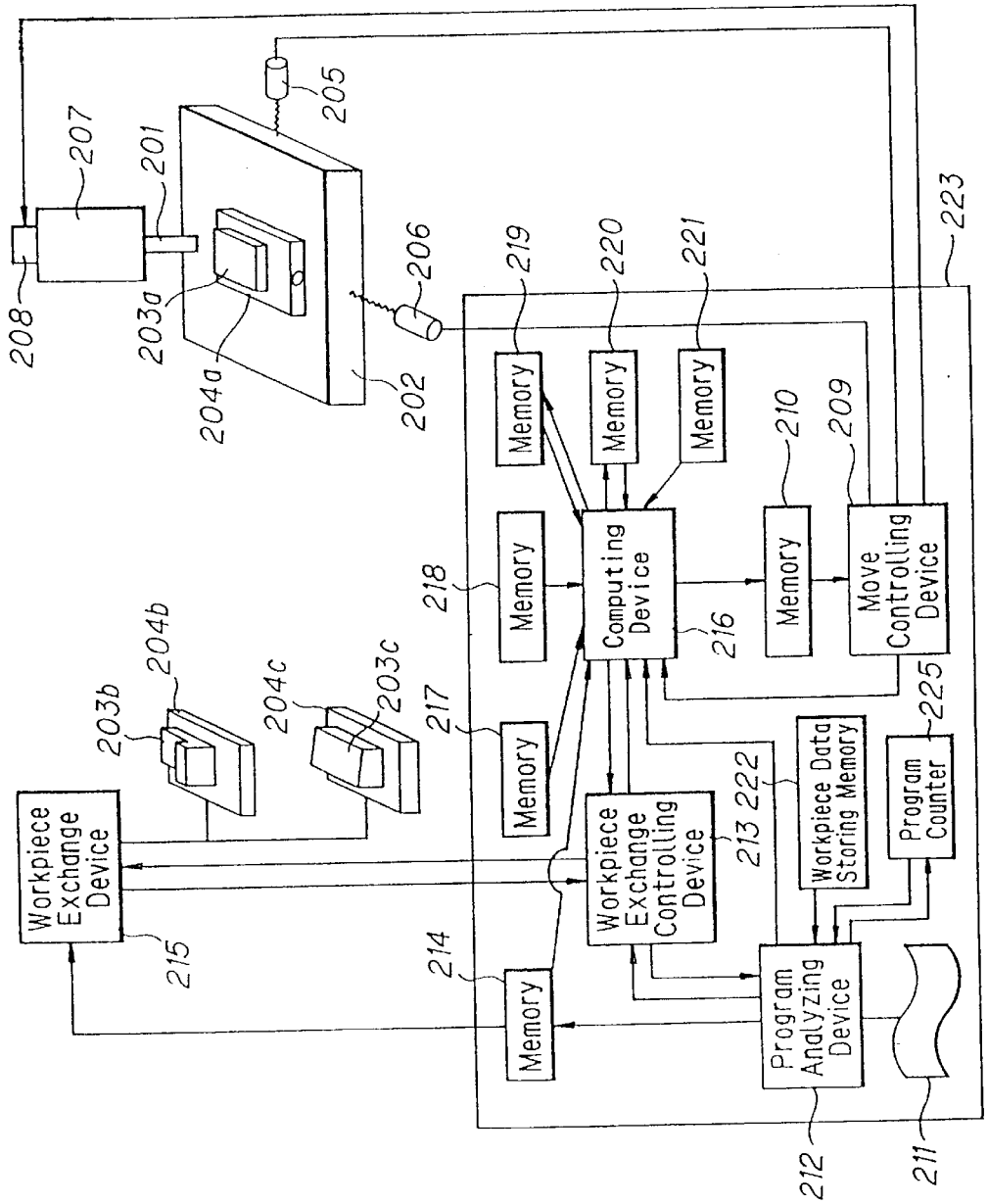
FIG. 22 is a block diagram showing the other embodiment of the electric discharge machining apparatus according to the present invention.

FIG. 22 is a block diagram showing another embodiment of the electric discharge machining apparatus, and in this figure, reference numeral 225 denotes is a program counter with "1" set as an initial value.

Figure 23:
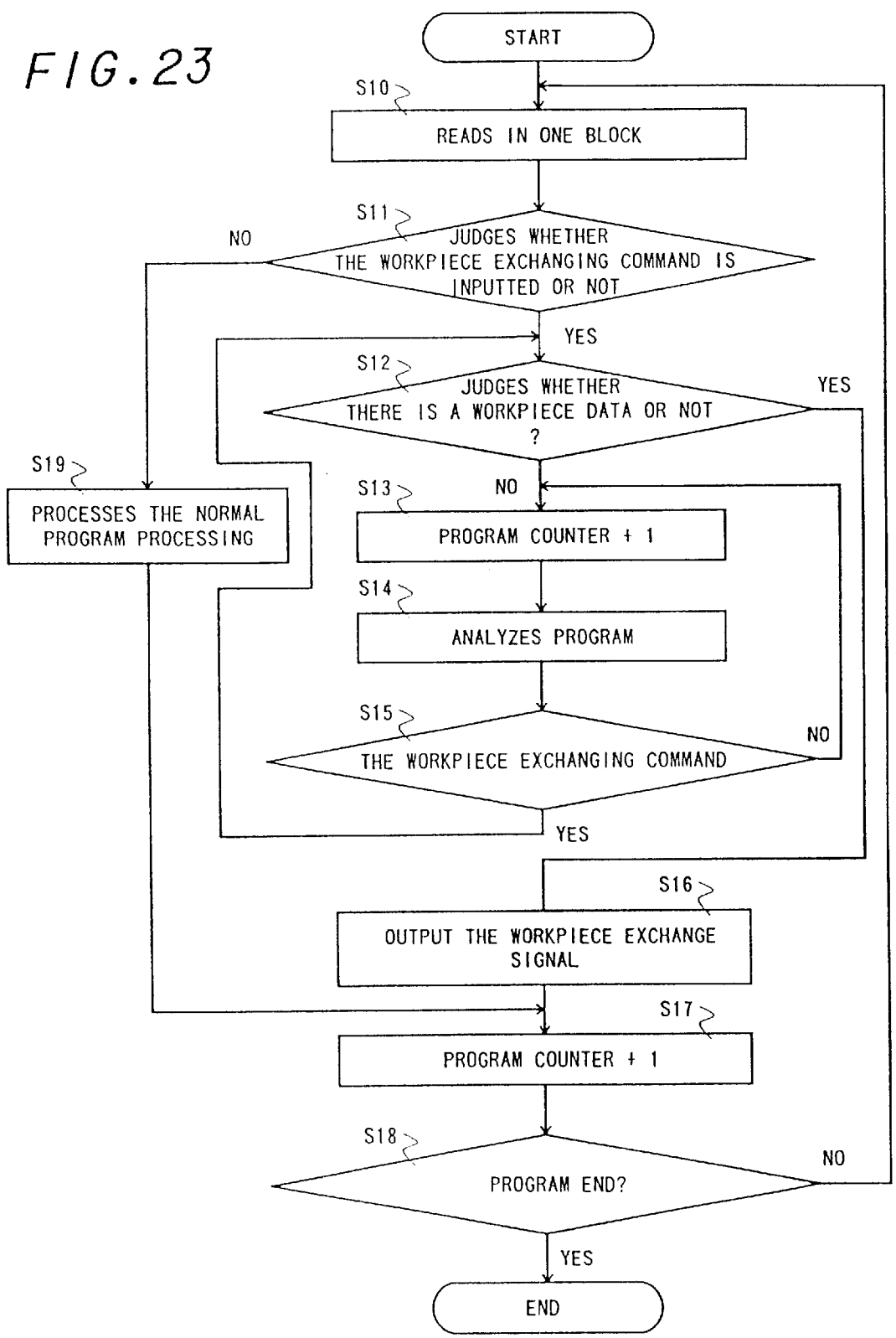
FIG. 23 is a flow chart showing a processing in the program analyzing device in the electric discharge machining apparatus shown in FIG. 22 according to the present invention.

FIG. 23 is a flow chart showing a processing in the program analyzing device 212 in the electric discharge machining apparatus shown in FIG. 22.

Operation will be described below with reference to FIG. 22 and FIG. 23. The program analyzing device 212 starts a program analysis of the NC program 211, upon input of an instruction for program start by an operator.

The program analyzing device 212 reads in one block shown by the program counter 225 from the NC program 211 (S10), judges whether there is a workpiece exchange command or not (S11), then judges whether there is a workpiece data having a workpiece number for the workpiece to be exchanged in the memory 222 or not by referring to the contents of the memory 222, in case where there is the workpiece exchanging command(S12). In case where there is the workpiece data, the program analyzing device 212 outputs a workpiece exchanging signal to the workpiece exchange controlling device 213 (S16). On the contrary, in case where there is no workpiece data in the memory, the program analyzing device 212 stops exchange of the workpiece and increments the program counter 225 (S13).

Thereafter, the program analyzing device 212 analyzes the next block (S14), and repeats the processing to the block having a workpiece exchange command (S15).

In the step S12, the program analyzing device 212 reads in the block for the workpiece exchanging command, and starts execution of the processing of the block. Namely, the program analyzing device 212 inputs the workpiece number to the memory, and outputs the workpiece exchanging signal to the workpiece exchange controlling device 213 (S16). Operation after the workpiece exchange controlling device 213 has received the workpiece exchanging signal is the same as the operation as shown in FIG. 17.

Figure 24:
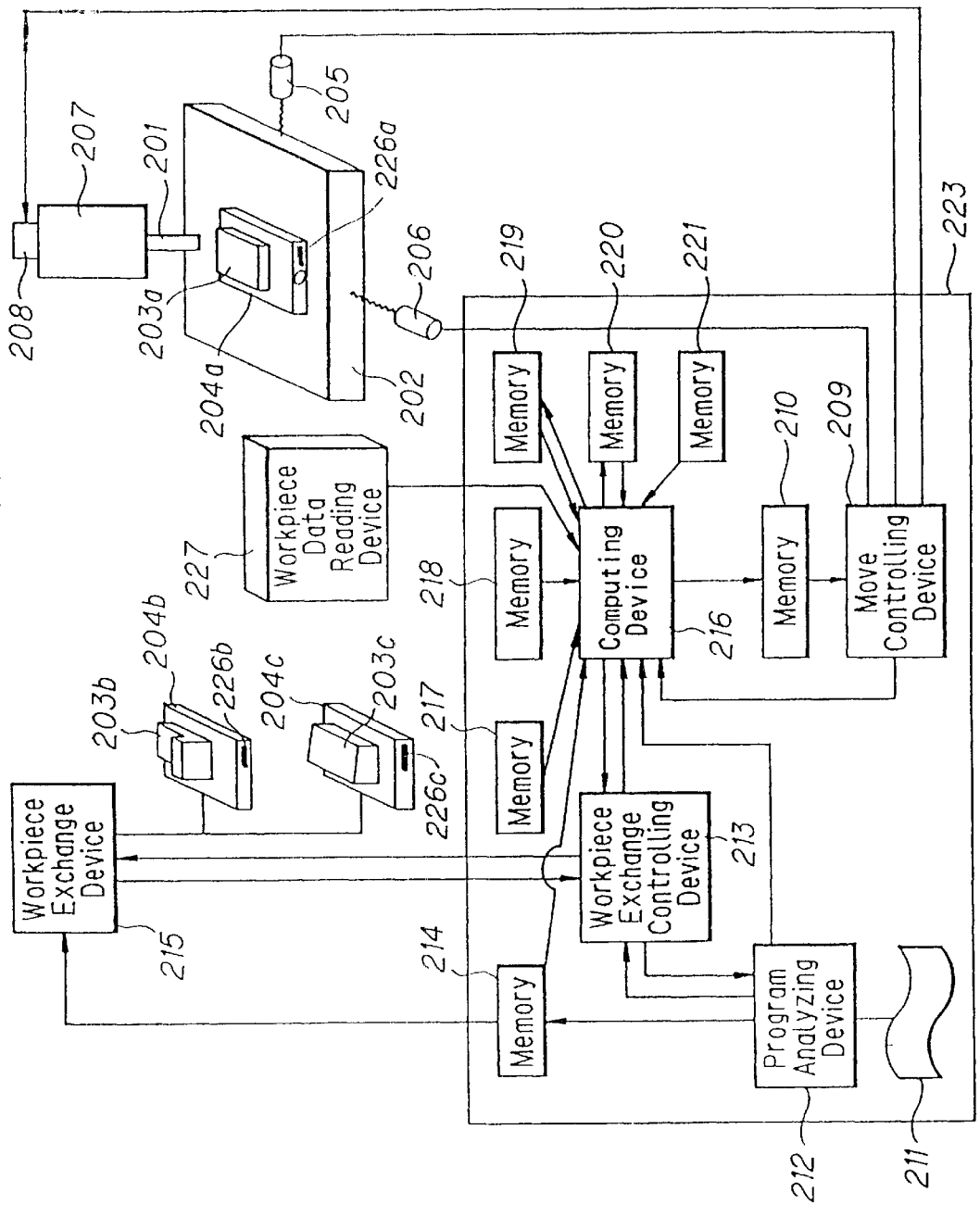
FIG. 24 is a block diagram showing the other embodiment of the electric discharge machining apparatus according to the present invention.

FIG. 24 is a block diagram showing a further embodiment of the electric discharge machining apparatus according to the present invention. In this figure, reference numeral 226a denotes a workpiece data storage device for the workpiece 203a set in the workpiece fixing device 204a, numeral 226b denotes a workpiece data storage device for the workpiece 203b set in the workpiece fixing device 204b, numeral 226c denotes a workpiece data storage device for the workpiece 203c set in the workpiece fixing device 204c, numeral 227 denotes a workpiece data reading device for reading workpiece data from the workpiece data storage devices 226a, 226b and 226c.

Operation will be described below with reference to FIG. 24. Exchange of the workpiece is finished by the workpiece exchange device by the workpiece exchange device 215, like in case shown in FIG. 18.

The workpiece exchange controlling device 213 which receive the workpiece exchange end signal outputs a workpiece data reading command to the workpiece data read device 227. The workpiece data reading device 227 reads the workpiece data in the workpiece data storage device 226a to 226c set in the workpiece or the workpiece fixing device 204a to 204c, inputs the data to the memory, and outputs a read end signal to the workpiece exchange controlling device 213. The workpiece exchange controlling device 213 outputs a return command to the move controlling device 209 upon input of the read end signal. The subsequent operation is the same as that shown in FIG. 17.

It should be noted that, although there is only one fixing point, on which a workpiece is fixed by the workpiece fixing device 204 on the table 202, there may be a plurality of fixing points on the table 202. and also that accurate detection on the workpiece fixing device 204 makes it possible for the workpiece fixing device to fix a workpiece at any point on the table 202.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A numerically controlled machining apparatus operative under control of a computer program for defining a sequence of operational steps, including a tool exchanging command, and for specifying tools required to perform such operational steps, comprising:
   a tool exchanging means, comprising a multiple tool carrier and a tool selection and transfer device, for carrying a plurality of different tools, each having a unique identifier, and for automatically exchanging a tool in response to a command in said program sequence;
   a specified tool registration means for obtaining from said program the unique identifier for the tools specified for use in said operational steps and for registering said unique identifiers;
   a tool set detecting means, comprising a unique identifier detector for detecting the unique identifier of tools currently present in said multiple tool carrier and being responsive to said unique identifiers in said specified tool registration means, for detecting whether a registered tool is present or not present in said tool exchanging means on the basis of a comparison of said detected unique identifiers and said stored unique identifiers; and
   a tool set condition displaying means for displaying an identification of each of the plurality of registered tools and identifying for each such registered tool whether or not said registered tool is set in said tool exchanging means and is detected by said tool set detecting means.

2. A numerically controlled machining apparatus according to claim 1, wherein said tool set condition display means displays the set condition of a tool with discrimination between a tool set in said tool exchanging means and a tool not set in said tool exchanging means on the basis of color.

3. A numerically controlled machining apparatus according to claim 1 wherein said specified tool registration means is operative to register a tool in said specified tool registration means if an exchange of the tool is requested by the program for the first time.

4. A numerically controlled machining apparatus according to claim 2 wherein said tool set condition displaying means displays the identification of the plurality of registered tools and a set condition of each said tool in a matrix format, said matrix format further including a display for each registered tool that is identified as being present and various type of tool data including parameters thereof and comprising at least one of a tool reduce allowance and a tool core gap amount.

5. A numerically controlled machining apparatus according to claim 4, wherein said tool set detecting means is operative to check all tools in said tool exchanging means and, on the basis of a comparison with said operative steps in said program, to judge whether each detected tool will be used or not used;
   tool parameter judging means for judging whether data for predetermined parameters are set for each tool detected by said tool set detecting means; and
   wherein said tool set condition displaying means displays for each tool an indication of whether or not said tool will be used and an indication of whether or not data for said predetermined parameters is set or not set.

6. A numerically controlled machining apparatus according to claim 5, wherein said indication is provided by displaying either a value for parameters that are present and a blank for parameters that are not present.

7. A numerically controlled machining apparatus, operative under control of a computer program for defining a sequence of operational steps, comprising:
   a workpiece fixing means for fixing a workpiece in said machining apparatus;
   a workpiece data receiving means for detecting workpiece data which has been set in said workpiece fixing means; and
   a workpiece data set indicating means for stopping said program, for displaying necessary workpiece data for execution of said program, and for prompting an operator to set workpiece data when said workpiece data receiving means detects that said necessary workpiece data has not been set in said workpiece fixing means.

8. A numerically controlled machining apparatus, operative under control of a computer program for defining a sequence of operational steps, comprising:
   a workpiece fixing means for fixing a workpiece on a table;
   a workpiece data storage means, in said workpiece fixing means, for storing data such as position and height of each workpiece and a unique identifier for each workpiece;
   a display means for displaying information with regard to the operational steps being conducted from the program and the unique identifier for a workpiece
   a program analyzing means for stopping execution of said program temporarily, in case where workpiece data of a workpiece for a workpiece exchanging command has not been inputted in said workpiece data storage means in the course of analyzing the blocks of said program, for displaying information concerning the block of said program during which the stop occurs and the corresponding unique identifier for said workpiece, and for restoring said program after said workpiece data is inputted;
   a computing means for computing a relative position of a tool to said table according to workpiece data stored in said workpiece data storage means; and
   a movement controlling means for controlling a movement of a spindle having a tool and said table according to a position of the tool to said table computed by said computing means.

9. The numerically controlled machining apparatus as set forth in claim 7 wherein said display further displays the blocks in said program and highlights the block that has been stopped by applying a color identifying a stop condition.

10. The numerically controlled machining apparatus as set forth in claim 8, wherein said wherein said display means further displays the blocks in said program and highlights the block that has been stopped by applying a color identifying a stop condition.

* * * * *